United States Patent
Gohshi et al.

(10) Patent No.: US 9,374,508 B2
(45) Date of Patent: Jun. 21, 2016

(54) IMAGE PROCESSING APPARATUS AND IMAGE PROCESSING METHOD

(71) Applicant: KEISOKU GIKEN Co., Ltd., Yokohama-shi, Kanagawa (JP)

(72) Inventors: Seiichi Gohshi, Yokohama (JP); Jin Ogasawara, Yokohama (JP); Shinichiro Nakamura, Yokohama (JP)

(73) Assignee: KEISOU GIKEN Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/767,690

(22) PCT Filed: Feb. 25, 2014

(86) PCT No.: PCT/JP2014/000990
§ 371 (c)(1),
(2) Date: Aug. 13, 2015

(87) PCT Pub. No.: WO2014/129209
PCT Pub. Date: Aug. 28, 2014

(65) Prior Publication Data
US 2015/0373234 A1    Dec. 24, 2015

(30) Foreign Application Priority Data
Feb. 25, 2013    (JP) .................... 2013-035186

(51) Int. Cl.
*H04N 5/208*    (2006.01)
*H04N 5/21*    (2006.01)
*G06T 5/20*    (2006.01)

(52) U.S. Cl.
CPC . *H04N 5/208* (2013.01); *G06T 5/20* (2013.01)

(58) Field of Classification Search
CPC .............................. H04N 5/208; H04N 5/21
USPC ......... 348/606, 625, 627, 607, 673, 628, 629; 382/264, 263, 274, 275; 358/532; 345/660
See application file for complete search history.

(56) References Cited

U.S. PATENT DOCUMENTS

| | | | |
|---|---|---|---|
| 8,339,421 B2 * | 12/2012 | Moriya ................. | G06T 3/4053 345/660 |
| 2013/0176495 A1 * | 7/2013 | Gohshi ................. | H04N 5/208 348/629 |

FOREIGN PATENT DOCUMENTS

| | | |
|---|---|---|
| JP | 2008-301441 A | 12/2008 |
| JP | 2008-306497 A | 12/2008 |
| WO | 2012/043407 A1 | 4/2012 |

OTHER PUBLICATIONS

Mar. 25, 2014 International Search Report issued in International Patent Application No. PCT/JP2014/000990.
Jun. 25, 2013 Office Action issued by the JPO for the corresponding Japanese Patent Application No. 2013-035186.

* cited by examiner

*Primary Examiner* — Jefferey Harold
*Assistant Examiner* — Jean W Desir
(74) *Attorney, Agent, or Firm* — Kenja IP Law PC

(57) ABSTRACT

An image is sharpened without generating, in frequency domain exceeding frequency component in horizontal and vertical direction, frequency component caused by sharpening carried out in horizontal and vertical direction in overlapping manner. An image processing apparatus includes: a vertical filter removing high frequency portion in vertical direction; a horizontal sharpening processing unit generating harmonic in horizontal direction containing frequency higher than frequency component in horizontal direction of the input signal; a horizontal filter removing high frequency portion in horizontal direction; and a vertical sharpening processing unit generating harmonic in vertical direction containing frequency higher than frequency component in vertical direction of the input signal, wherein a horizontal direction processing unit in which the vertical filter is disposed before the horizontal sharpening processing unit and a vertical direction processing unit in which the horizontal filter is disposed before the vertical sharpening processing unit are connected in series, or in parallel.

16 Claims, 22 Drawing Sheets

Sin

S1

S2

Sin+Sout

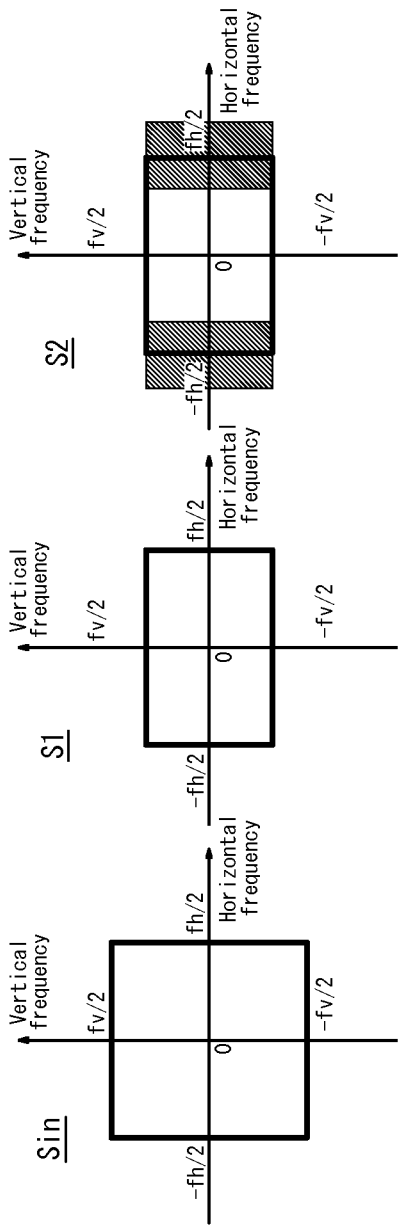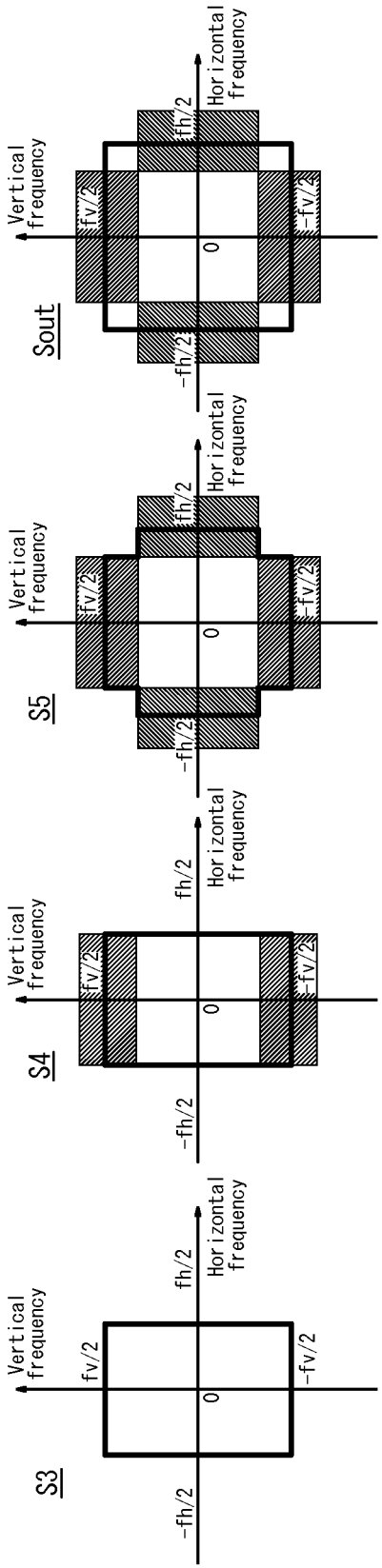

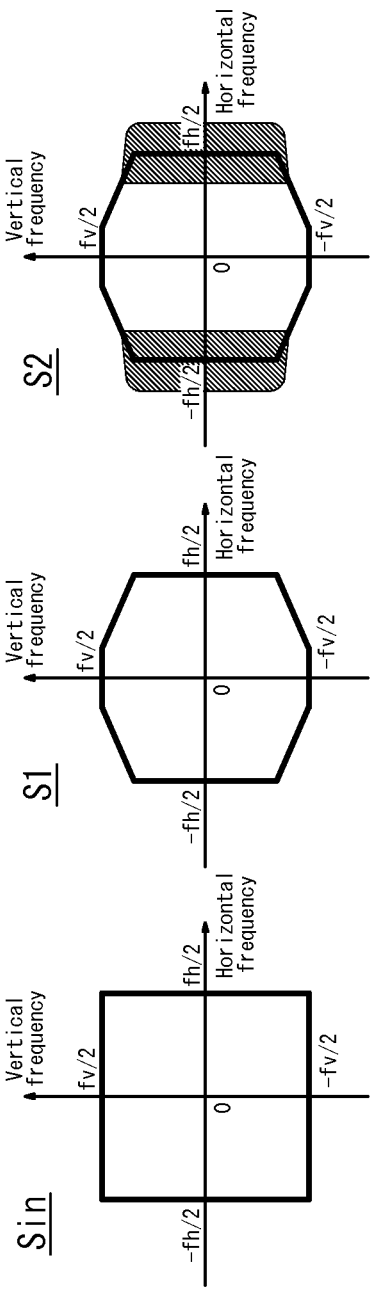

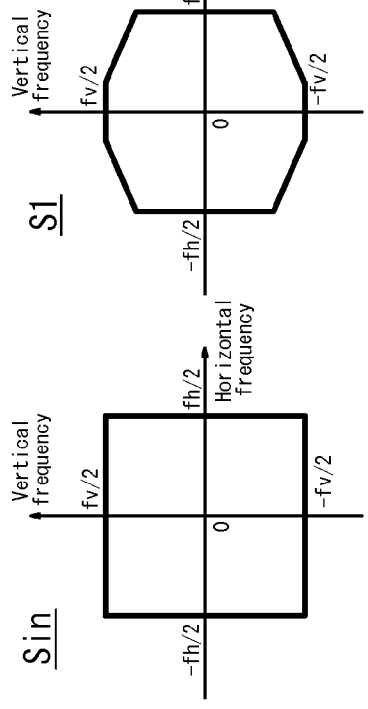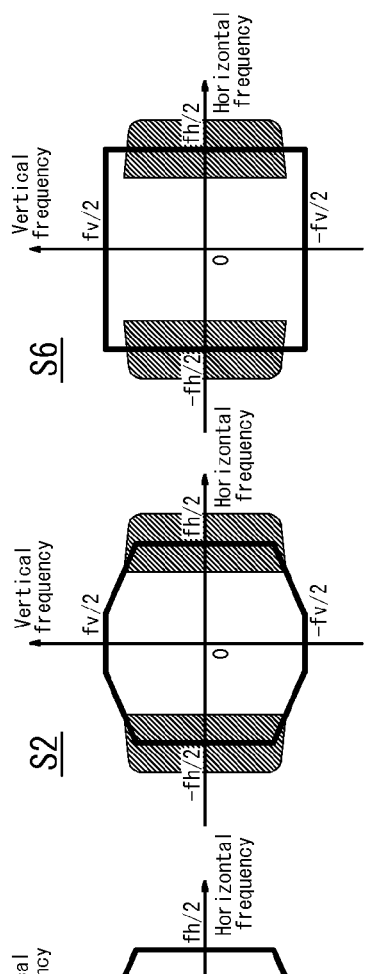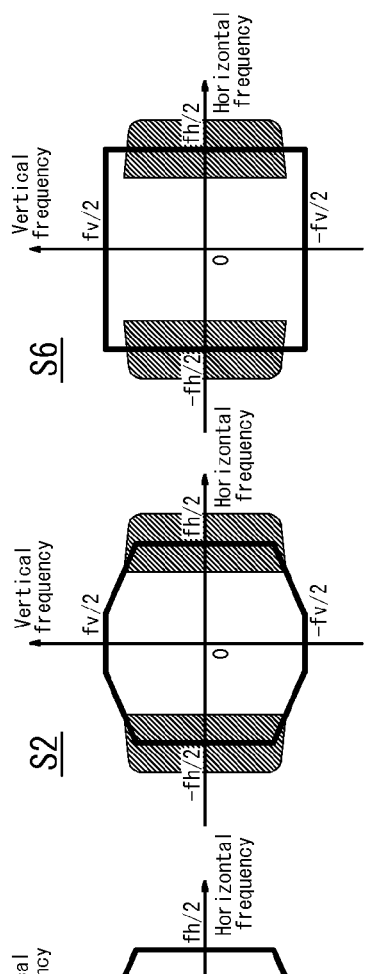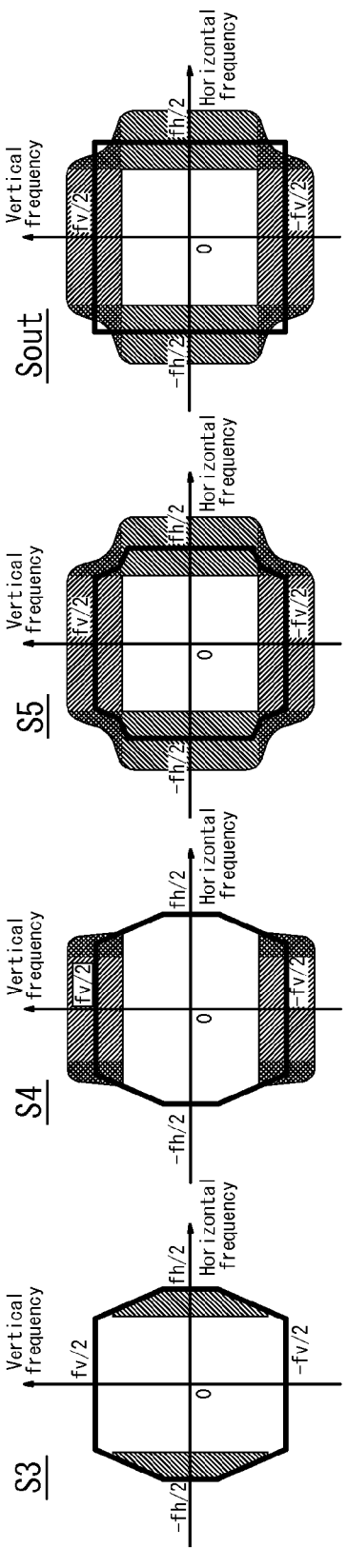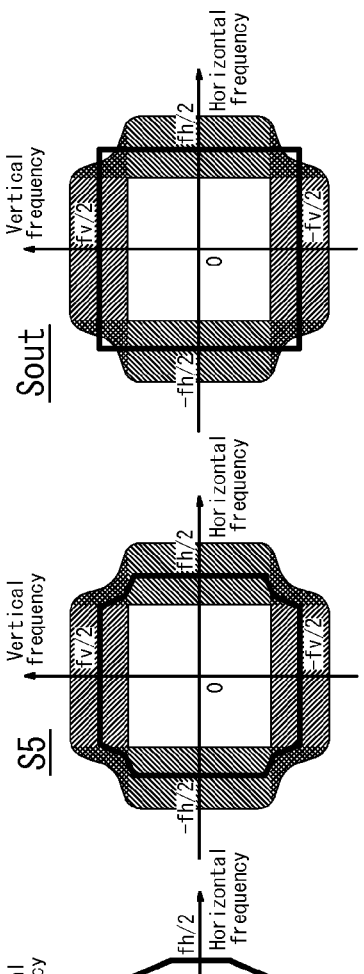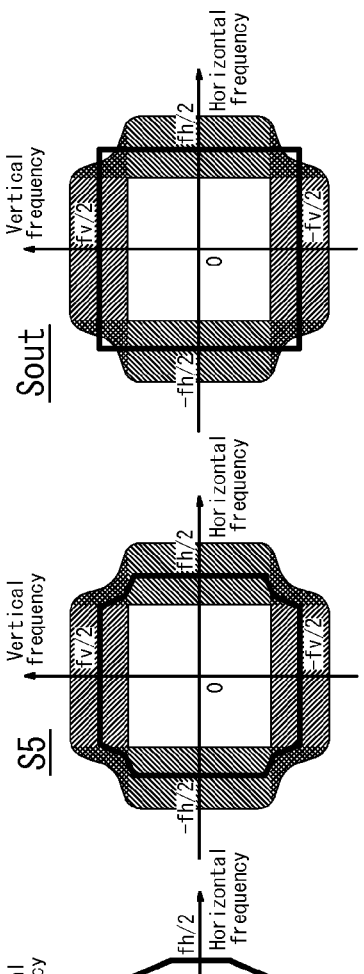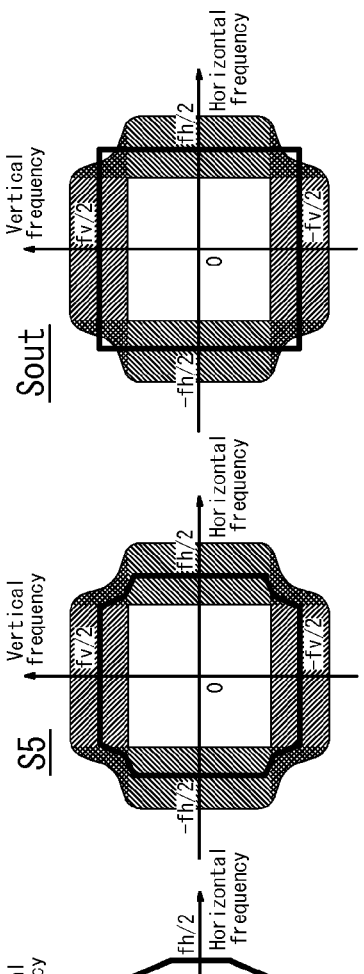

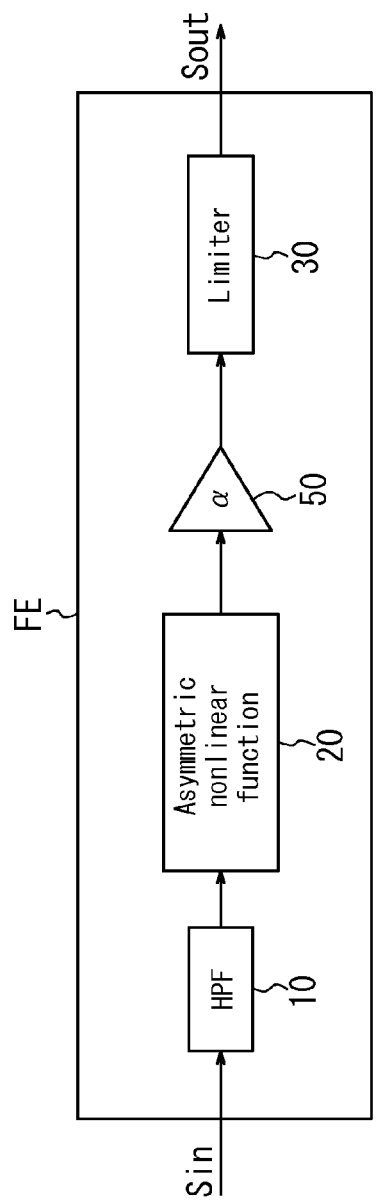
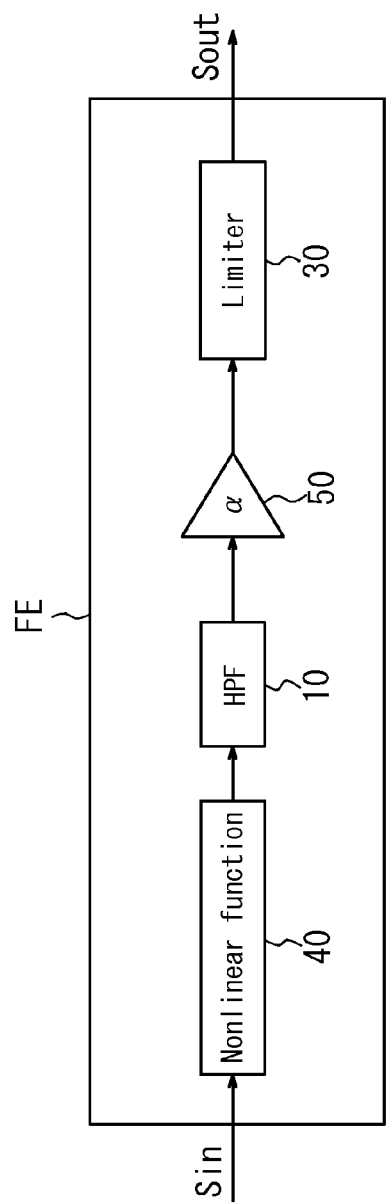

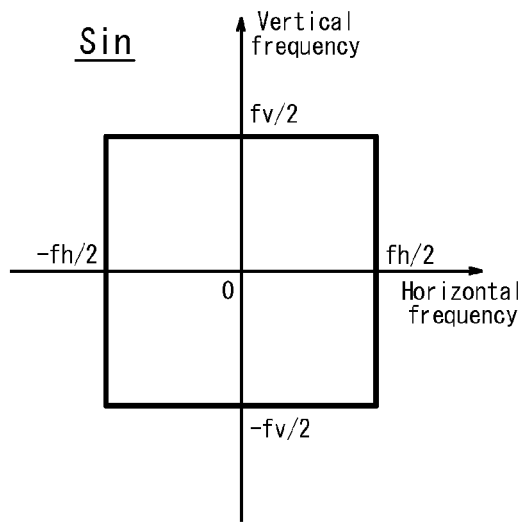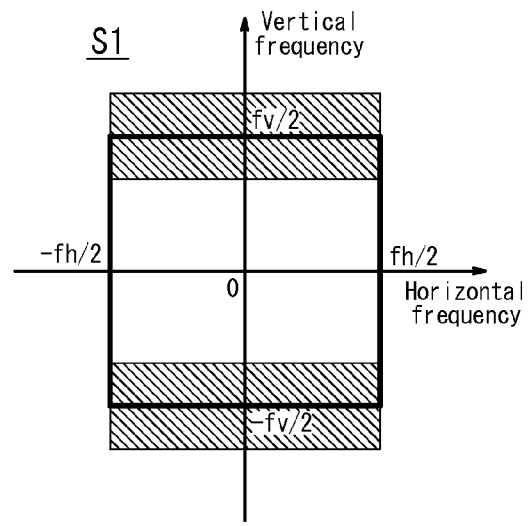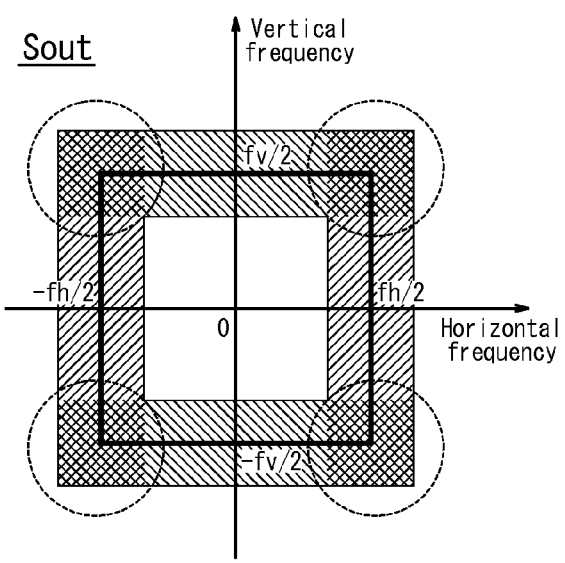

Sin

S1

Sout

S3

S2

IMAGE PROCESSING APPARATUS AND IMAGE PROCESSING METHOD

CROSS REFERENCE TO RELATED APPLICATION

This application claims priority to and the benefit of Japanese Patent Application No. 2013-035186 (filed on Feb. 25, 2013), the entire contents of which are incorporated herein by reference.

TECHNICAL FIELD

This disclosure relates to an image processing apparatus and an image processing method those for improving image quality by sharpening an image and, more specifically, to an image processing apparatus and an image processing method those suitable for sharpening, for example, a video displayed in real time on a television (TV) receiver.

BACKGROUND

When a full high-definition television (HDTV: High Definition Television, 1080×1920 pixels) receiver enlarges an image signal with resolution lower than that for the HDTV and displays an image thus obtained, the image becomes blurry. Similarly, when an image represented by an image signal with resolution for the HDTV is enlarged to an image with higher definition (for example, 4K resolution of approximately 4000×2000 pixels), the image becomes blurry. As such, a conventional television receiver performs edge compensating for sharpening rise and fall of a video signal corresponding to an outline portion of an image to be displayed. In edge compensation, a high frequency component of an input image signal (a luminance signal) is extracted, amplified, and then added to the input image signal, thereby improving visual image quality.

Here, when sharpening processing is carried out on a high frequency component in a horizontal direction and a high frequency component in a vertical direction of an image, a phenomenon in which an oblique line of the image subjected to the sharpening processing appears to glitter occurs, which is likely to become a problem especially in sharpening processing employing nonlinear processing for generating a high frequency component exceeding a Nyquist frequency.

FIG. 19 is a diagram illustrating a configuration for consecutively performing, in the vertical direction and in the horizontal direction, the sharpening processing for generating the high frequency component exceeding the Nyquist frequency. FIG. 20 are diagrams illustrating a frequency component of a signal at each stage. FIG. 20A illustrates a frequency component of an input image signal $S_{in}$ of a digital image having a sampling frequency fh in the horizontal direction and a sampling frequency fv in the vertical direction. The digital image has a Nyquist frequency fh/2 in the horizontal direction and a Nyquist frequency fv/2 in the vertical direction and, as illustrated in the figure, there is no frequency component in a range exceeding the Nyquist frequency. When the sharpening processing is carried out on the input image signal $S_{in}$ in the vertical direction, in a signal S1 thus obtained, as illustrated in FIG. 20B, the frequency component is generated in a wide region exceeding the Nyquist frequency fv/2 in the vertical direction. When the sharpening processing is further carried out on the signal 51 in the horizontal direction, in an output image signal $S_{out}$ thus obtained, as illustrated in FIG. 20C, the frequency component is generated in a wide region exceeding the Nyquist frequency fh/2 in the horizontal direction. As illustrated in the figure, regions at four corners of the frequency component of the output image signal $S_{out}$, i.e., regions at a high frequency in both the horizontal direction and the vertical direction are subjected to the sharpening processing in the horizontal direction and in the vertical direction in an overlapping manner, whereby the glitter of the image is emphasized.

In order to clear such glitter, a technique having a two-dimensional filter disposed at a preceding stage of horizontal sharpening processing and vertical sharpening processing has been proposed (see PLT 1).

CITATION LIST

Patent Literature

PLT 1: WO2012/043407

SUMMARY

Technical Problem

The PLT 1, as illustrated in FIG. 21, includes the two-dimensional filter disposed at the preceding stage of a horizontal sharpening processing unit and a vertical sharpening processing unit. FIG. 22 is a diagram illustrating an example of frequency characteristics of the two-dimensional filter. As illustrated in the figure, the two-dimensional filter has characteristic to attenuate the high frequency component of the input image signal $S_{in}$ in both the horizontal direction and the vertical direction. FIG. 23 are diagrams illustrating a frequency component of the signal at each stage in a circuit of FIG. 21. In the circuit of FIG. 21, when the input image signal $S_{in}$ of the digital image having the sampling frequency fh in the horizontal direction and the sampling frequency fv in the vertical direction is subjected to the two-dimensional filter, among the frequency components of a first signal S1 thus obtained, a high frequency component is attenuated in the horizontal direction and in the vertical direction as illustrated in FIG. 23B. When the first signal S1 is subjected to horizontal sharpening processing, a second signal S2 thus obtained, as illustrated in FIG. 23C, has a frequency component expanded in the horizontal direction. When the first signal S1 and the second signal S2 are synthesized by an adder and a signal thus obtained is subjected to vertical sharpening processing, a third signal S3 thus obtained, as illustrated in FIG. 23D, has a frequency component expanded in the vertical direction. Then, an adder disposed at a subsequent stage synthesizes the signal at a preceding stage of the vertical sharpening processing and the signal subjected to the vertical sharpening processing, and thus outputs the image signal $S_{out}$.

In the output image signal $S_{out}$ generated by the circuit of FIG. 21, as illustrated in FIG. 23E, in regions at the four corners of the frequency component, i.e, in regions at a high frequency in both the horizontal direction and the vertical direction, a harmonic is further generated in the vertical direction of the signal that has the harmonic generated in the horizontal direction. Therefore, although the output image signal $S_{out}$ is less deteriorated than the signal of FIG. 20C, there is a problem that the displayed image is still likely to glitter/flicker. There is another problem that setting a narrow passing area in the two-dimensional filter for the purpose of clearing the glittering/flickering reduces signal components used for the sharpening processing, inhibiting effective sharpening.

Therefore, it could be helpful to provide an image processing apparatus and an image processing method those capable of sharpening the image without generating, in a frequency domain exceeding both the frequency component in the horizontal direction of the input image and the frequency component in the vertical direction, a frequency component caused by the sharpening processing carried out in the horizontal direction and in the vertical direction in an overlapping manner.

Solution to Problem

One of the disclosed aspects therefore provides an image processing apparatus for sharpening an input image by generating a frequency component higher than a frequency component contained in an input image signal representing the input image, the image processing apparatus includes:

a vertical filter configured to remove, at least from a high frequency portion in a horizontal direction contained in the input image signal, a high frequency portion of a frequency component in a horizontal direction of the input image signal;

a horizontal sharpening processing unit configured to generate a harmonic in the horizontal direction containing a frequency component higher than the frequency component in the horizontal direction contained in the input image signal;

a horizontal filter configured to remove, at least from a high frequency portion in the horizontal direction contained in the input image signal, a high frequency portion of a frequency component in the vertical direction of the input image signal; and a vertical sharpening processing unit configured to generate a harmonic in the vertical direction containing a frequency component higher than the frequency component in the vertical direction contained in the input image signal, wherein a horizontal direction processing unit in which the vertical filter is disposed at a preceding stage of the horizontal sharpening processing unit and a vertical direction processing unit in which the horizontal filter is disposed at a preceding stage of the vertical sharpening processing unit are connected in parallel, and an amplifier is connected to a subsequent stage of any one of the horizontal direction processing unit and the vertical direction processing unit and also to a preceding stage of the other.

An amplification factor β of the amplifier is preferably 0≤β≤1.

Also, our image processing apparatus for sharpening an input image by generating a frequency component higher than a frequency component contained in an input image signal representing the input image, the image processing apparatus includes:

a vertical filter configured to remove, at least from a high frequency portion in a horizontal direction contained in the input image signal, a high frequency portion of a frequency component in a vertical direction of the input image signal;

a horizontal sharpening processing unit configured to generate a harmonic in the horizontal direction containing a frequency component higher than the frequency component in the horizontal direction contained in the input image signal;

a horizontal filter configured to remove, at least from a high frequency portion in the vertical direction contained in the input image signal, a high frequency portion of a frequency component in the horizontal direction of the input image signal; and a vertical sharpening processing unit configured to generate a harmonic in the vertical direction containing a frequency component higher than the frequency component in the vertical direction contained in the input image signal, wherein at least one of the horizontal sharpening processing unit and the vertical sharpening processing unit has: a filter unit configured to generate a first signal by removing at least a DC component of a frequency component in an input signal; a nonlinear processing unit configured to generate a second signal by carrying out, on the first signal, nonlinear processing asymmetric between a positive region and a negative region of the first signal, the nonlinear processing being represented by a continuous function made up of nonlinear processing applied to the positive region of the first signal and nonlinear processing applied to the negative region those passing through an origin and, also, configured to generate a frequency component having a frequency band asymmetric between the positive region and the negative region; and a limiter configured to generate a third signal by adjusting the second signal, and a horizontal direction processing unit in which the vertical filter is disposed at a preceding stage of the horizontal sharpening processing unit and a vertical direction processing unit in which the horizontal filter is disposed at a preceding stage of the vertical sharpening processing unit are connected in series, or in parallel.

Further, our image processing apparatus for sharpening an input image by generating a frequency component higher than a frequency component contained in an input image signal representing the input image, the image processing apparatus includes:

a vertical filter configured to remove, at least from a high frequency portion in a horizontal direction contained in the input image signal, a high frequency portion of a frequency component in a vertical direction of the input image signal;

a horizontal sharpening processing unit configured to generate a harmonic in the horizontal direction containing a frequency component higher than the frequency component in the horizontal direction contained in the input image signal;

a horizontal filter configured to remove, at least from a high frequency portion in the vertical direction contained in the input image signal, a high frequency portion of a frequency component in the horizontal direction of the input image signal; and a vertical sharpening processing unit configured to generate a harmonic in the vertical direction containing a frequency component higher than the frequency component in the vertical direction contained in the input image signal, wherein at least one of the horizontal sharpening processing unit and the vertical sharpening processing unit has: a nonlinear processing unit configured to generate a first signal by carrying out nonlinear processing on an input signal, the nonlinear processing being represented by a nonlinear function containing the first signal in a continuous manner with respect to the input signal and, also, configured to generate a frequency component that is not contained in the input signal; a filter unit configured to generate a second signal by removing at least a DC component of a frequency component contained in the first signal; and a limiter configured to generate a third signal by adjusting the second signal, and a horizontal direction processing unit in which the vertical filter is disposed at a preceding stage of the horizontal sharpening processing unit and a vertical direction processing unit in which the horizontal filter is disposed at a preceding stage of the vertical sharpening processing unit are connected in series, or in parallel.

Preferably, the image processing apparatus further includes a field change detection unit configured to detect a change of the input image signal, wherein the field change detection unit lowers a degree of enhancement of the frequency component by the vertical sharpening processing unit when the input image signal significantly changes in the vertical direction, or lowers a degree of enhancement of the frequency component by the horizontal sharpening processing unit when the input image signal significantly changes in the horizontal direction.

In order to solve the above problems, further, our image processing method applied to a procedure employed by an image processing apparatus for sharpening an input image by generating a frequency component higher than a frequency component contained in an input image signal representing the input image, the image processing method includes:

a horizontal direction processing step of removing, at least from a high frequency portion in a horizontal direction contained in the input image signal, a high frequency portion of a frequency component in a vertical direction of the input image signal and generating a harmonic in the horizontal direction containing a frequency component higher than the frequency component in the horizontal direction contained in the input image signal;

a vertical direction processing step of removing, at least from the high frequency portion in the vertical direction of the input image signal, a high frequency portion of a frequency component in the horizontal direction of the input image signal and generating a harmonic in the vertical direction containing a frequency component higher than the frequency component in the vertical direction contained in the input image signal; and a switchover step of switching over between parallel execution and series execution of the vertical direction processing step and the horizontal direction processing step, based on an amplification factor $\beta$, wherein the vertical direction processing step and the horizontal direction processing step are executed in series, or in parallel.

The amplification factor $\beta$ is preferably $0 \leq \beta \leq 1$.

Also, our image processing method applied to a procedure employed by an image processing apparatus for sharpening an input image by generating a frequency component higher than a frequency component contained in an input image signal representing the input image, the image processing method includes:

a horizontal direction processing step of removing, at least from a high frequency portion in a horizontal direction contained in the input image signal, a high frequency portion of a frequency component in a vertical direction of the input image signal and generating a harmonic in the horizontal direction containing a frequency component higher than the frequency component in the horizontal direction contained in the input image signal; and a vertical direction processing step of removing, at least from the high frequency portion in the vertical direction of the input image signal, a high frequency portion of a frequency component in the horizontal direction of the input image signal and generating a harmonic in the vertical direction containing a frequency component higher than the frequency component in the vertical direction contained in the input image signal; wherein at least one of the horizontal direction processing step and the vertical direction processing step has: a step of generating a first signal by removing at least a DC component of a frequency component contained in an input signal; a nonlinear processing step of generating a second signal by carrying out, on the first signal, nonlinear processing asymmetric between a positive region and a negative region of the first signal, the nonlinear processing being represented by a continuous function made up of nonlinear processing applied to the positive region of the first signal and nonlinear processing applied to the negative region those passing through an origin and, also, generating a frequency component having a frequency band asymmetric between the positive region and the negative region; and an adjustment step of generating a third signal by adjusting the second signal, and the vertical direction processing step and the horizontal direction processing step are executed in series, or in parallel.

Further, our image processing method applied to a procedure employed by an image processing apparatus for sharpening an input image by generating a frequency component higher than a frequency component contained in an input image signal representing the input image, the image processing method includes:

a horizontal direction processing step of removing, at least from a high frequency portion in a horizontal direction contained in the input image signal, a high frequency portion of a frequency component in a vertical direction of the input image signal and generating a harmonic in the horizontal direction containing a frequency component higher than the frequency component in the horizontal direction contained in the input image signal; and a vertical direction processing step of removing, at least from the high frequency portion in the vertical direction of the input image signal, a high frequency portion of a frequency component in the horizontal direction of the input image signal and generating a harmonic in the vertical direction containing a frequency component higher than the frequency component in the vertical direction contained in the input image signal; wherein at least one of the horizontal direction processing step and the vertical direction processing step has: a nonlinear processing step of generating a first signal by carrying out nonlinear processing on an input signal, the nonlinear processing being represented by a nonlinear function containing the first signal in a continuous manner with respect to the input signal and, also, generating a frequency component that is not contained in the input signal; a step of generating a second signal by removing at least a DC component of a frequency component contained in the first signal; and a step of generating a third signal by adjusting the second signal, and the vertical direction processing step and the horizontal direction processing step are executed in series, or in parallel.

Preferably, the image processing method further includes a step of detecting a change of the input image signal and lowering, when the input image signal significantly changes in the vertical direction, a degree of enhancement of the frequency component at the vertical direction processing step, or lowering, when the input image signal significantly changes in the horizontal direction, a degree of enhancement of the frequency component at the horizontal direction processing step.

Advantageous Effect

Our image processing apparatus and image processing method are capable of sharpening an image without generating, in a frequency domain exceeding both the frequency component in the horizontal direction of the input image and the frequency component in the vertical direction of the input image, a frequency component caused by the sharpening processing carried out in the horizontal direction and in the vertical direction in an overlapping manner, thereby reducing the glitter/flicker of the image.

BRIEF DESCRIPTION OF THE DRAWINGS

In the accompanying drawings:

FIGS. 6A to 6D FIG. 6 are diagrams illustrating the horizontal direction waveform of the signal level of the image in association with the sharpening processing;

FIGS. 11A to 11G are diagrams illustrating a change of the frequency component of the signal according to the third embodiment;

FIGS. 14A to 14G are diagrams illustrating a first change of the frequency component of the signal according to the fourth embodiment;

FIGS. 15A to 15H are diagrams illustrating a second change of the frequency component of the signal according to the fourth embodiment;

FIGS. 17A to 17B are diagrams illustrating a configuration of the sharpening processing unit according to the fifth embodiment;

FIGS. 20A to 20C are diagrams illustrating a change of the frequency component caused by the conventional sharpening processing;

DETAILED DESCRIPTION

Hereinafter, embodiments will be described with reference to the accompanying drawings.

An image processing apparatus (an integrated circuit) according to each embodiment, schematically speaking, is an apparatus for carrying out sharpening processing for sharpening an image on a frequency component in a horizontal direction (a transverse direction, a main scanning direction) of the image and a frequency component in a vertical direction (a longitudinal direction, a sub-scanning direction) of the image.

The sharpening processing carried out by the image processing apparatus is an operation for carrying out nonlinear processing on a signal representing an input image (hereinafter, referred to as an input image signal), thereby sharpening (enhancing) rise and fall of a signal corresponding to an outline portion (an edge) contained in the input image. The sharpening processing carried out by the image processing apparatus is capable of adding, to an image signal, a high frequency component which cannot be used by conventional sharpening processing that employs a linear operation such as amplification processing and the like, thereby highly (intensely) sharpening the image.

First, an outline of a sharpening processing unit, which is a main element of the image processing apparatus according to each embodiment described later, will be described. Note that the sharpening processing unit may be either one of a horizontal sharpening processing unit and a vertical sharpening processing unit described later. A term "sharpening processing unit" will be used herein when it is not necessary to distinguish between the horizontal sharpening processing unit and the vertical sharpening processing unit.

(Example of First Configuration of Sharpening Processing Unit)

Figure 1:
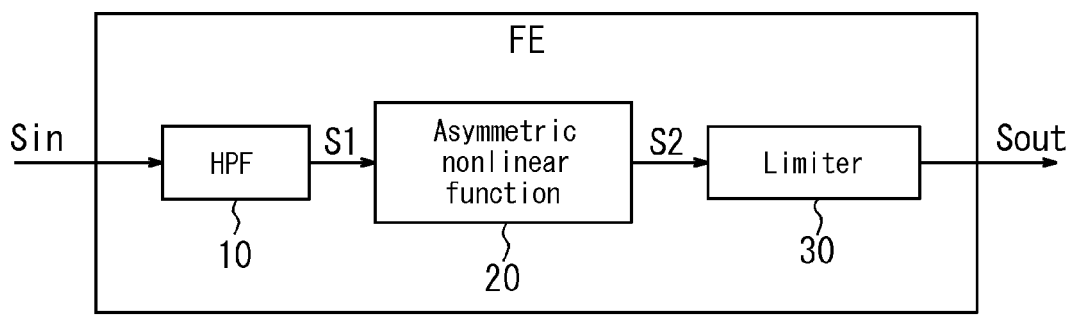
FIG. 1 is a diagram illustrating a first configuration of our sharpening processing unit.

FIG. 1 is a block diagram illustrating an example of a first configuration of a sharpening processing unit FE. The sharpening processing unit FE carries out, on an input image signal $S_{in}$ that is externally input and serves as a digital signal representing an image, an operation for sharpening the image represented by the input image signal $S_{in}$. The sharpening processing unit FE includes a HPF (High Pass Filter) 10, a nonlinear processing unit 20 (an asymmetric nonlinear function), and a limiter 30.

The image represented by the input image signal $S_{in}$ may be either a still image or a video. When the input image signal $S_{in}$ represents the video, the video may be displayed in real time in, for example, a standard definition television (SDTV: Standard Definition Television) receiver or a high definition television (HDTV: High Definition Television) receiver.

Hereinafter, by using a horizontal direction waveform of a signal level (a luminance value) of the image illustrated in FIG. 2 by way of example, an operation of each element and a waveform output therefrom will be described. Note that, although herein each element will be described in association with the horizontal direction waveform of the signal level of the image, the sharpening processing similar to that for the horizontal direction waveform of the signal level may be carried out also on an vertical direction waveform of the signal level of the image and a waveform of a signal level in a time direction between images of the video.

Figure 2A:
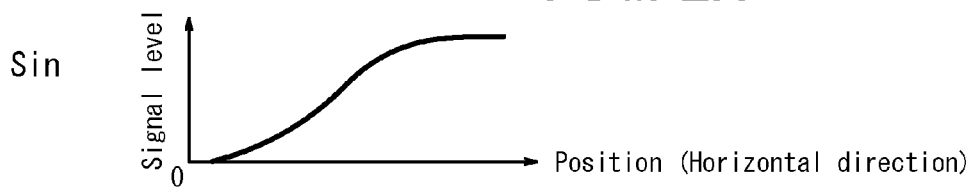
FIGS. 2A to 2D are diagrams illustrating a horizontal direction waveform of a signal level of an image in association with sharpening processing.

FIG. 2A is a diagram illustrating the horizontal direction waveform of the signal level of the input image signal $S_{in}$, especially illustrating a portion of the waveform corresponding to the edge where the signal level changes in the horizontal direction. Note that resolution of the input image signal $S_{in}$ corresponds to that of an output image signal $S_{out}$. Therefore, when the resolution of an output image is higher than that of the input image originally input, it means that the input image signal $S_{in}$ is up-converted to have the resolution of the output image signal $S_{out}$. For example, when the image processing apparatus outputs an image of the SDTV as an image of the HDTV, the input image signal $S_{in}$ is converted to have the resolution of the HDTV by existing linear conversion carried out on the input image signal $S_{in}$ of the original image of the SDTV.

The HPF 10 removes at least a DC component of a frequency component contained in the input image signal $S_{in}$, and thus generates a first signal S1, which is a high frequency signal. In particular, the HPF 10 extracts a high frequency component containing an edge component of the image represented by the input image signal $S_{in}$ and also extracts the first signal S1 of FIG. 2B from the input image signal $S_{in}$ of FIG. 2A.

Figure 3:
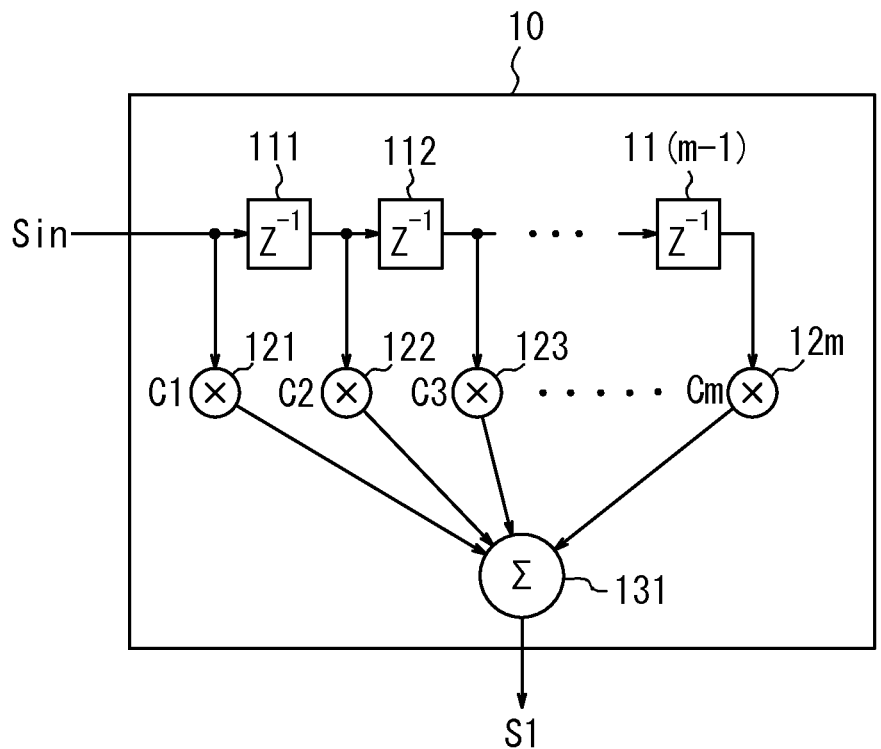
FIG. 3 is a diagram illustrating an example of a configuration of a high pass filter.
Figure 4:
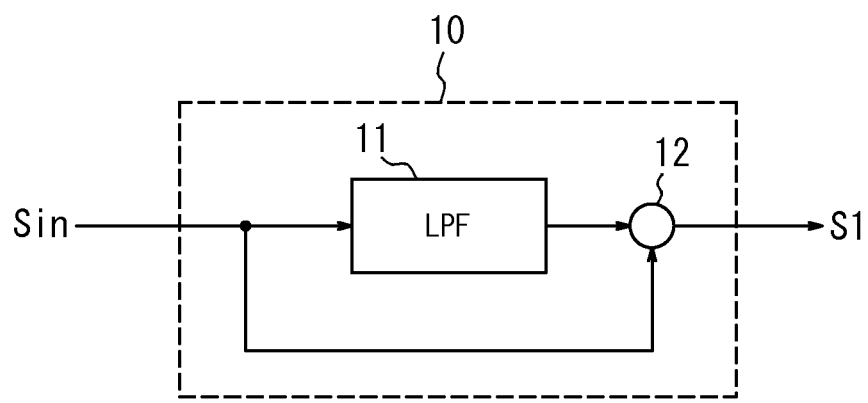
FIG. 4 is a diagram illustrating an example of the high pass filter containing a low pass filter.

FIG. 3 is a block diagram illustrating a configuration of the HPF 10. As illustrated in FIG. 3, the HPF 10 may be constituted by using a transversal digital filter having m-number of taps (m is 3 or more) made up of m−1 number of unit delay elements 111 to 11(m−1), m-number of multipliers 121 to 12m, and one adder 131. In this case, each multiplier 12j (j=1 to m, the same applies hereinafter) multiplies the input signal by a coefficient Cj and outputs a result thus obtained to the adder 131. The coefficient Cj is set such that the HPF 10 extracts the high frequency component containing the outline component (for example, m=3, C1=0.5, C2=−1, and C3=0.5). In general, a low pass filter is substantialized easily as compared with a high pass filter. FIG. 4 is a diagram illustrating an example of the high pass filter containing the low pass filter. As illustrated in FIG. 4, the HPF 10 illustrated in FIG. 1 may be substantialized by using a low pass filter (hereinafter, referred to as an "LPF") 11 and a subtracter 12.

Figure 2B:
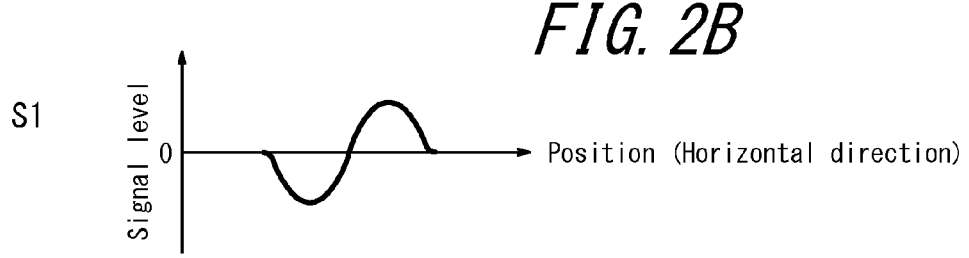

A nonlinear processing unit 20 carries out, on the first signal S1, nonlinear processing asymmetric between a positive region and a negative region of the first signal S1, thereby generating a second signal S2. The first signal S1, as illustrated in FIG. 2B, contains the outline component in a positive direction and the outline component in a negative direction. Here, the positive direction and the negative direction of the first signal S1 correspond to a white direction and a black direction of a pixel, respectively. When nonlinear processing different (asymmetric) between these directions rather than nonlinear processing the same (symmetric) between these directions is carried out, edge enhancement becomes more suitable for human visual characteristics. That is, the nonlinear processing unit 20 carries out different (asymmetric) nonlinear processing on the outline component in the positive direction of the first signal S1 and the outline component in the negative direction. Hereinafter, the nonlinear processing asymmetric between the positive direction and the negative direction of the first signal S1 is referred to as "asymmetric nonlinear processing".

Figure 2C:
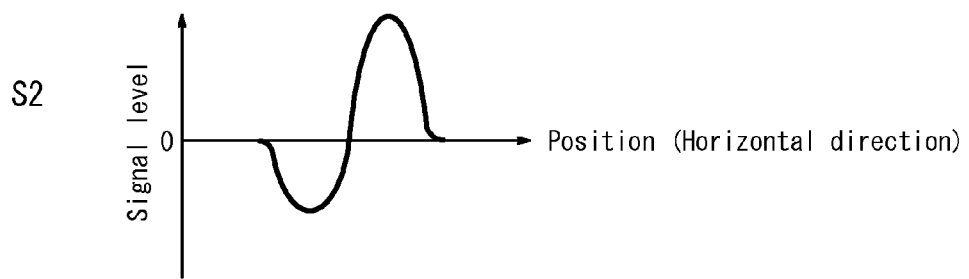

The asymmetric nonlinear processing carried out by the nonlinear processing unit 20 may be any combination of nonlinear processing, as long as a value of the nonlinear processing applied to the positive region and a value of the nonlinear processing applied to the negative region are continuous around the origin (a point where the value is zero) of the first signal S1. The present embodiment assumes that the nonlinear processing unit 20, for example, generates the second signal S2 by raising the first signal S1 to the third power ($S2=S1^3$) when the first signal S1 is positive and by squaring the first signal S1 and adding a minus sign ($S2=-S1^2$) when the first signal S1 is negative. FIG. 2C is a diagram illustrating a waveform of the second signal S2 subjected to the asymmetric nonlinear processing carried out by the nonlinear processing unit 20. As illustrated in the figure, the waveform in the positive region of the second signal S2 is significantly amplified. As described later, also, when the nonlinear processing asymmetric between the positive region and the negative region is carried out, a frequency component asymmetric between the positive region and the negative region may be generated.

When the nonlinear processing unit 20 carries out the nonlinear processing that is asymmetric between the positive direction and the negative direction of the first signal S1, the image sharpening processing that matches human perception characteristics as described later may be substantialized. For example, Weber-Fechner law is known as a law based on the human sense. When this law is applied to image recognition, it can be said that an outline in a low luminance region may be perceived more easily than an outline in a high luminance region. Therefore, the nonlinear processing unit 20, for example, by carrying out the nonlinear processing on a region with a low signal level (luminance), even when the edge component is very small before the nonlinear processing, may emphasize the edge component of the first signal S1 to allow perception of the outline. Also, since the nonlinear processing unit 20 significantly amplifies the waveform in the positive region such that the outline in the high luminance region is more sharpened, the outline in the high luminance region may be easily perceived. In both regions, further, a high frequency component may be generated by the nonlinear processing.

Note that the asymmetric nonlinear processing carried out by the nonlinear processing unit 20 is not limited to a combination of the square processing and the cube processing but may be another nonlinear processing. For example, the nonlinear processing carried out on the positive region and the negative region of the first signal S1 may be expressed by Formula (1). The nonlinear processing carried out by each processing unit includes all of exponential multipliers of a general rational number represented by p/q. In such exponentiation processing, whether the first signal S1 is positive or negative is to be maintained; for example, when even powers (e.g., square) is carried out as the exponentiation processing and the first signal S1 is negative, the sign of a value obtained from the exponentiation processing is maintained as negative (for example, $S2=-S1^2$).

[Formula 1]

$$S2 = S1^{\frac{p}{q}} \tag{1}$$

Also, the nonlinear processing unit 20, for the asymmetric nonlinear processing, may use any appropriate combination of various nonlinear functions such as a trigonometric function (e.g., $S2=S_{in}(S1)$), a logarithmic function (e.g., $S2=\log(|S|+1)$), and a gamma correction function (e.g., $S2=S1^{1/2}$).

Further, the nonlinear processing unit 20 may carry out the nonlinear processing that does not use the general formula shown in Formula (1). For example, the nonlinear processing unit 20 may preliminarily hold a table and the like of an addition value for each signal level of the first signal S1 and, for an 8-bit signal level that takes a value between a minimum value 0 and a maximum value 255, add a value within a range of ±10 according to the signal level of the first signal S1.

The limiter 30 functions as a regulator of the amplitude (the signal level) of the second signal S2 and, by adjusting the second signal S2, outputs the output image signal $S_{out}$. In particular, the limiter 30 carries out clipping for limiting the amplitude of the second signal S2 within a predetermined upper limit value, or gain adjustment of the level of the second signal S2 by multiplying the second signal S2 by a gain α

($0 \leq \alpha \leq 1$). The limiter 30, for noise removal, may also carry out a rounding operation for rounding off a signal value equal to or lower than a predetermined lower limit value to 0. The limiter 30 carries out the clipping, the gain adjustment, the rounding operation and the like on the second signal S2 and outputs the output image signal $S_{out}$ thus obtained.

Figure 2D:
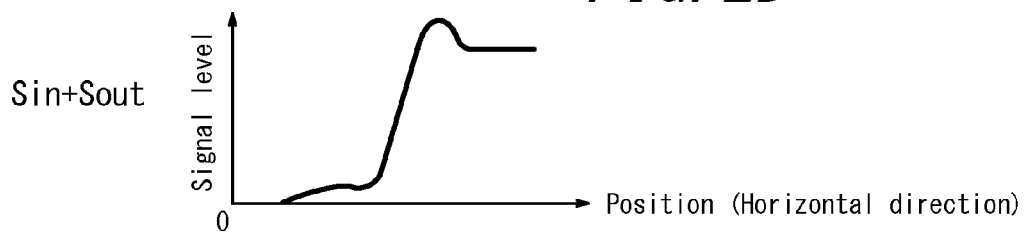

An adder (not shown) adds the output image signal $S_{out}$ illustrated in FIG. 2C as a compensation signal used for sharpening the image to the input image signal $S_{in}$ illustrated in FIG. 2A and thus generates a signal illustrated in FIG. 2D. The rise of the edge portion of this signal ($S_{in}+S_{out}$) is sharper than the rise of the edge portion of the input image signal $S_{in}$. That is, an image sharper than the image represented by the input image signal $S_{in}$ may be obtained.

(Example of Second Configuration of Sharpening Processing Unit)

Figure 5:
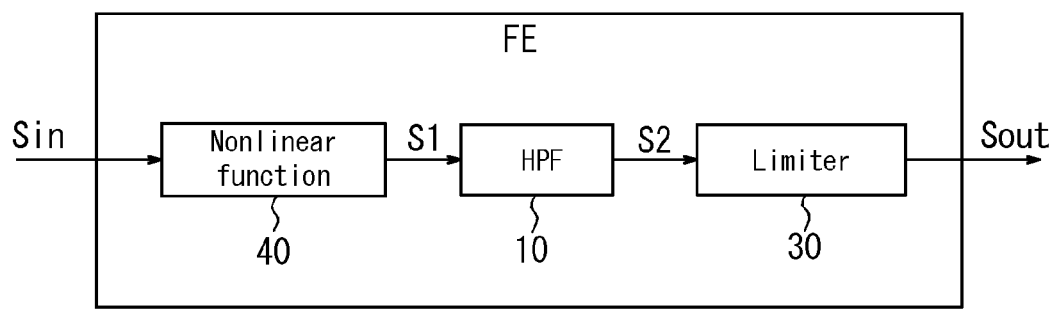
FIG. 5 is a diagram illustrating a second configuration of our sharpening processing unit.

FIG. 5 is a block diagram illustrating an example of a second configuration of the sharpening processing unit. This sharpening processing unit FE includes a nonlinear processing unit 40 (a nonlinear function), the HPF 10, and the limiter 30. The following is a description of an operation of each element and a waveform output therefrom by using, by way of example, the horizontal direction waveform of the signal level (the luminance value) of the image illustrated in FIG. 6. Note that, on the vertical direction waveform of the signal level of the image and a waveform of the signal level in the time direction between images of the video, the sharpening processing similar to that for the horizontal direction waveform of the signal level of the image may be carried out.

Figure 6A:
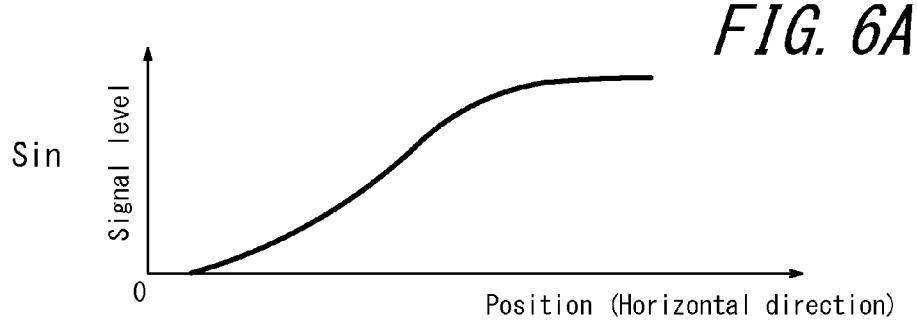

FIG. 6A is a diagram illustrating the horizontal direction waveform of the signal level of the input image signal $S_{in}$, particularly illustrating a portion of the waveform corresponding to the edge where the signal level changes in the horizontal direction.

The nonlinear processing unit 40 carries out the nonlinear processing on the input image signal $S_{in}$ and thus generates the first signal S1. The nonlinear processing unit 40 carries out the nonlinear processing in order to sharpen the outline of the image. In particular, the nonlinear processing unit 40 processes the input image signal $S_{in}$ illustrated in FIG. 6A into the first signal S1 illustrated in FIG. 6B having sharp rise of the edge of the signal level.

The processing for generating the first signal S1 from the input image signal $S_{in}$ carried out by the nonlinear processing unit 40 may be generalized by Formula (2). The nonlinear processing carried out by the nonlinear processing unit 40 includes all of the exponential multipliers of the general rational number represented by p/q.

[Formula 2]
$$S1 = S_{in}^{\frac{p}{q}} \quad (2)$$

For example, the nonlinear processing unit 40 generates the first signal S1 from a power of the input image signal $S_{in}$. When the nonlinear processing unit 40 generates the first signal S1 by raising the input image signal $S_{in}$ to n, $S1=S_{in}^n$ is satisfied. Since the input image signal $S_{in}$ is the digital signal (a discrete signal), when, in particular, data sequences constituting the input image signal $S_{in}$ are X1, X2, X3, . . . , the first signal S1 is a digital signal composed of data sequences $X1^n$, $X2^n$, $X3^n$, . . . . Note that the n is any real number.

Figure 6B:
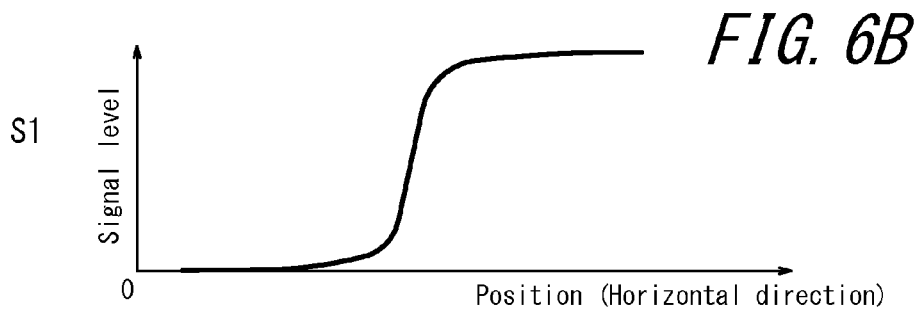

For example, when the input image signal $S_{in}$ is an 8-bit digital signal, the signal level of each pixel takes a value between 0 and 255. At this time, when the nonlinear processing unit 40 squares the input image signal $S_{in}$, the rise of the edge portion becomes sharp as illustrated in FIG. 6B. Thereby, the outline of the image becomes more emphasized.

Or, the nonlinear processing unit 40 generates the first signal S1 from, for example, a radical root of the input image signal $S_{in}$. When the nonlinear processing unit 40 generates the first signal S1 from an n-th root of the input image signal $S_{in}$, $S1=S_{in}^{1/n}$ is satisfied. Since the input image signal $S_{in}$ is the digital signal (the discrete signal), when, in particular, the data sequences constituting the input image signal Sj are X1, X2, X3, . . . , the first signal S1 is a digital signal composed of data sequences $X1^{1/n}$, $X2^{1/n}$, $X3^{1/n}$, . . . . Note that the n is any real number.

The nonlinear processing for generating the first signal S1 from the radical root of the input image signal S is suitable for extraction of the outline based on the human perception characteristics. For example, the Weber-Fechner law is known as the law based on the human sense. When this law is applied to the image recognition, it can be said that the outline in the low luminance region may be perceived more easily than the outline in the high luminance region. Therefore, in order to emphasize the very small edge component in the low luminance region so as to allow the perception of the outline, the nonlinear processing unit 40 carries out the nonlinear processing using, for example, a gamma correction function (for example, $S1=S_{in}^{1/2}$), thereby increasing the number of pixels with low luminance rather than pixels with high luminance In this case, the nonlinear processing unit 40, by using Formula (3), calculates X' that is a value obtained by normalization of a pixel value X of an m-bit digital signal. A value of the X' after the normalization by using the Formula (3) takes a value between 0 and 1.

[Formula 3]
$$X' = \frac{X}{2^m} \quad (3)$$

Here, the nonlinear processing unit 40, by adopting the gamma correction function shown in Formula (4) to the X' after the normalization, calculates a value Y after the nonlinear processing.

[Formula 4]
$$Y = X'^{\frac{1}{n}} \quad (4)$$

By the Formula (4), when the X' is small, a value of the Y after the nonlinear processing is increased to be higher than the X'. That is, the number of pixels with low luminance is further increased more than the number of pixels with high luminance. Thereby, the edge sharpening processing illustrated in FIG. 6B for illustrative purposes increases enhanced edge components particularly in a low luminance region, whereby the outline of the image especially in the low luminance region is more emphasized.

The HPF 10 generates the second signal S2 serving as a high frequency signal by removing at least the DC component of the frequency component contained in the first signal S1. In particular, the HPF 10, in operation for extracting the high frequency component containing the outline component of the image obtained through the nonlinear processing carried out on the input image signal $S_{in}$, extracts the second signal S2 in FIG. 6C from the first signal S1 of FIG. 6B.

The limiter 30 functions as an adjuster of the amplitude (the signal level) of the second signal S2 and generates the output image signal $S_{out}$ by adjusting the second signal S2. The limiter 30 carries out the clipping, the gain adjustment, the rounding operation and the like on the second signal S2 and outputs the output image signal $S_{out}$ thus obtained.

Figure 6C:
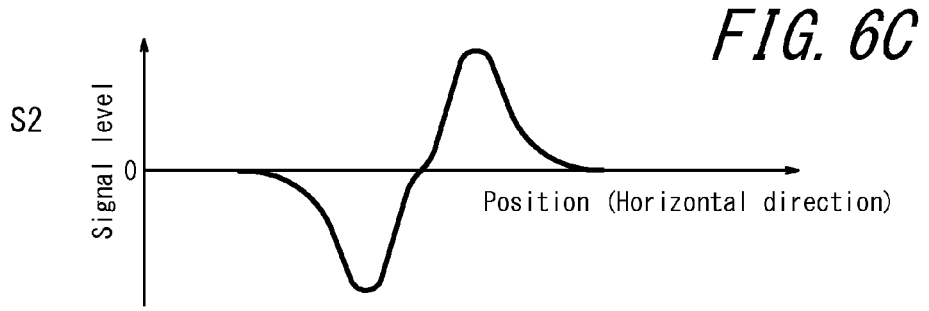
Figure 6D:
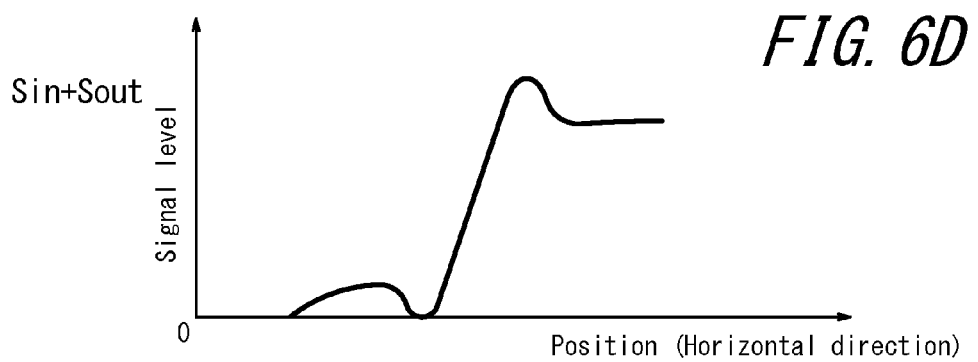

When the adder (not shown) adds the output image signal $S_{out}$ illustrated in FIG. 6C, as the compensation signal used for sharpening the image, to the input image signal $S_{in}$ illustrated in FIG. 6A, a signal illustrated in FIG. 6D is generated. The raise of the edge portion of this signal ($S_{in}+S_{out}$) is sharper than the raise of the edge portion of the input image signal $S_{in}$. That is, an image sharper than that represented by the input image signal $S_{in}$ may be obtained.

The following is a detailed description of the image processing apparatus having the sharpening processing unit FE described above for sharpening the frequency component in the horizontal direction (the lateral direction, the main scanning direction) and in the vertical direction (the longitudinal direction, the sub-scanning direction) of the image. The input image signal $S_{in}$ of each embodiment has the sampling frequency fh in the horizontal direction, the sampling frequency fv in the vertical direction, the Nyquist frequency fh/2 in the horizontal direction, and the Nyquist frequency fv/2 in the vertical direction.

(First Embodiment)

Figure 7:
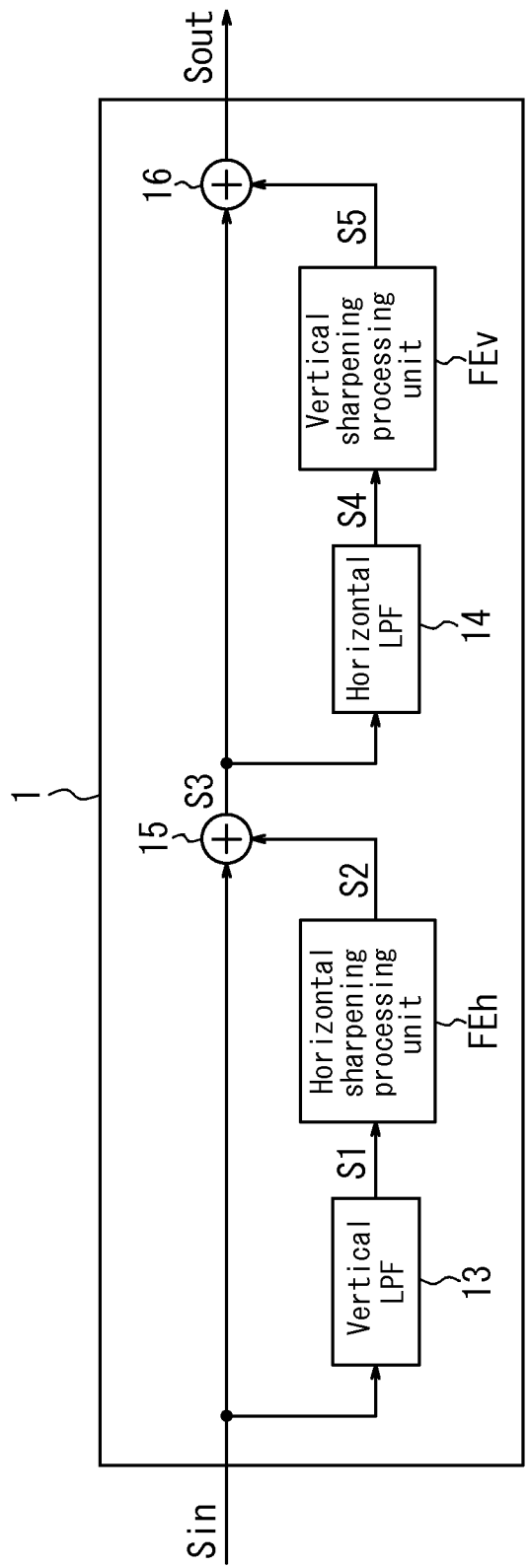
FIG. 7 is a diagram illustrating a configuration of an image processing apparatus according to a first embodiment.
Figure 8:
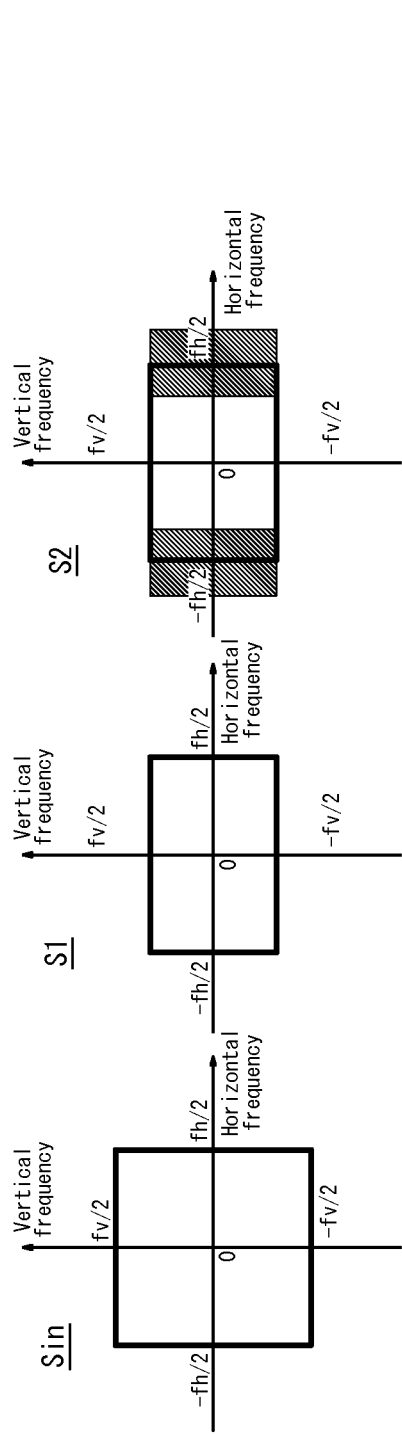
FIGS. 8A to 8G are diagrams illustrating a change of a frequency component of a signal according to the first embodiment.

FIG. 7 is a diagram illustrating an image processing apparatus 1 according to a first embodiment. The image processing apparatus 1 includes a vertical LPF (a vertical filter) 13, a horizontal LPF (a horizontal filter) 14, a horizontal sharpening processing unit FEh, a vertical sharpening processing unit FEv, a first adder 15, and a second adder 16. The image processing apparatus 1 includes a horizontal direction processing unit in which the vertical LPF 13 is disposed at a preceding stage of the horizontal sharpening processing unit FEh and a vertical direction processing unit in which the horizontal LPF 14 is disposed at a preceding stage of the vertical sharpening processing unit FEv. The horizontal direction processing unit and the vertical direction processing unit are connected in series. FIG. 8 are diagrams illustrating the frequency component of the image represented by the signal output by each functional block of the image processing apparatus 1. The following is a description of an operation of each functional block in association with the frequency component in FIG. 8.

The vertical LPF 13 removes the high frequency portion of the frequency component in the vertical direction of the input image signal $S_{in}$. The vertical LPF 13 partially attenuates a high frequency domain of the frequency component in the vertical direction of the input image signal $S_{in}$ and outputs the first signal S1 to the horizontal sharpening processing unit FEh. FIG. 8B is a diagram illustrating the frequency component of the first signal S1. The vertical LPF 13 attenuates the high frequency domain of the frequency component in the vertical direction. Note that the high frequency portion or the high frequency domain mentioned herein is removed or attenuated in order to prevent generation of the high frequency component that is caused by the sharpening processing in a region at a high frequency both in the horizontal direction and the vertical direction and causes the glitter. The high frequency portion or the high frequency domain, in consideration of sharpening characteristics of the sharpening processing unit FE disposed at a subsequent stage, may be appropriately determined by those who are skilled in the art.

The horizontal sharpening processing unit FEh generates a harmonic in the horizontal direction containing the frequency component higher than the frequency component in the horizontal direction contained in the input image signal $S_{in}$. The horizontal sharpening processing unit FEh carries out the sharpening processing in the horizontal direction of the image represented by the first signal S1 received from the vertical LPF 13 and outputs the second signal S2 thus obtained to the first adder 15. FIG. 18C is a diagram illustrating the frequency component of the second signal S2. The horizontal sharpening processing unit FEh generates the harmonic in the horizontal direction containing the frequency component exceeding the Nyquist frequency in the horizontal direction.

The first adder 15 generates the third signal S3 by combining the input image signal $S_{in}$ with the second signal S2 received from the horizontal sharpening processing unit FEh. FIG. 8D is a diagram illustrating the frequency component of the third signal S3. The third signal S3 is obtained by adding, to the frequency component of the input image signal $S_{in}$, the harmonic in the horizontal direction containing the frequency component exceeding the Nyquist frequency in the horizontal direction. Especially, no harmonics in the horizontal direction containing the frequency component exceeding the Nyquist frequency in the horizontal direction is generated in the high frequency domain in the vertical direction.

The horizontal LPF 14 removes the high frequency portion of the frequency component in the horizontal direction of the third signal S3. The horizontal LPF 14 partially attenuates the high frequency domain of the frequency component in the horizontal direction of the third signal S3 and outputs a fourth signal S4 thus obtained to the vertical sharpening processing unit FEv. FIG. 8E is a diagram illustrating a frequency component of the fourth signal S4. The horizontal LPF 14 attenuates the high frequency domain of the frequency component in the horizontal direction. Note that the high frequency portion or the high frequency domain mentioned herein is removed or attenuated in order to prevent generation of the high frequency component that is caused by the sharpening processing in a region at a high frequency both in the horizontal direction and the vertical direction and causes the glitter. The high frequency portion or the high frequency domain, in consideration of the sharpening characteristics of the vertical sharpening processing unit FEv disposed at a subsequent stage, may be appropriately determined by those who are skilled in the art.

The vertical sharpening processing unit FEv generates the harmonic in the vertical direction containing the frequency component higher than the frequency component in the vertical direction contained in the input image signal $S_{in}$. The vertical sharpening processing unit FEv carries out the sharpening processing in the vertical direction of the image represented by the fourth signal S4 received from the horizontal LPF 14 and outputs a fifth signal S5 thus obtained to the second adder 16. FIG. 8F is a diagram illustrating a frequency component of a fifth signal S5. The vertical sharpening processing unit FEv generates the harmonic in the vertical direction containing the frequency component exceeding the Nyquist frequency in the vertical direction.

The second adder 16 generates the output image signal $S_{out}$ by combining the third signal S3 received from the first adder 15 with the fifth signal S5 received from the vertical sharpening processing unit FEv. FIG. 8G is a diagram illustrating the frequency component of the output image signal $S_{out}$. The output image signal $S_{out}$ is obtained by adding, to the frequency component of the input image signal $S_{in}$, the harmonic containing the frequency component exceeding the Nyquist frequency in both the horizontal direction and the vertical direction. Especially, no frequency component exceeding the Nyquist frequency is generated in the region at a high frequency in both the horizontal direction and the vertical direction.

According to the present embodiment, as described above, since the vertical LPF 13 is disposed at the preceding stage of the horizontal sharpening processing unit FEh and the horizontal LPF 14 is disposed at the preceding stage of the vertical sharpening processing unit FEv, the image may be sharpened without generating, in the frequency domain exceeding the frequency component in both the horizontal direction and the vertical direction of the input image, the frequency component caused by the sharpening operation in both the horizontal direction and the vertical direction in the overlapping manner, thereby reducing the glitter/flicker of the image. Also, since the method of the present embodiment may separately select the filter (including a two-dimensional filter described later) particularly for the bandwidth necessary for the generation of the harmonic in the horizontal direction and the harmonic in the vertical direction, an excellent harmonic may be obtained in each of the horizontal direction and the vertical direction without causing the noise. Therefore, a sharp image may be obtained.

Also, since the image processing apparatus 1 according to the present embodiment may be substantialized by the simple configuration illustrated in FIG. 7, when the image processing apparatus 1 is used in the high definition television (HDTV) receiver and a standard definition television (SDTV) receiver, the image processing apparatus 1 may improve image quality of the video displayed in real time as well as a still image without significantly increasing cost.

Also, since the high frequency domain exceeding the Nyquist frequency may be compensated, the present embodiment is effective especially in improving the image quality by sharpening the image represented by the image signal subjected to the enlargement processing. For example, when the image signal of the standard definition television (SDTV) receiver is subjected to the enlargement processing and displayed in a display of the high definition television (HDTV) receiver, the present embodiment is highly effective in sharpening the video displayed in real time by using the simple configuration. Also, technologies of a display with approximately 4000×2000 pixels (hereinafter, referred to as a "4k display"), which is more pixels than the HDTV, and also of television broadcasting corresponding thereto have been currently developed. Therefore, also when the image signal for the HDTV is up-converted into an image signal of an image to be displayed in the 4k display, the present embodiment is highly effective from the similar viewpoint.

Note that the image processing apparatus 1 may alter the order of the sharpening processing in the horizontal direction and the sharpening processing in the vertical direction. That is, the order of the configuration of the sharpening processing in the horizontal direction (the vertical LPF 13, the horizontal sharpening processing FEh, and the first adder 15) and the configuration of the sharpening processing in the vertical direction (the horizontal LPF 14, the vertical sharpening processing unit FEv, and the second adder 16) may be altered for the processing of the input image signal $S_{in}$.

Also, in place of the vertical LPF 13 and the horizontal LPF 14, the two-dimensional filter may be used. In this case, at a preceding stage of the horizontal sharpening processing unit FEh, preferably, the two-dimensional filter is disposed to remove, at least from the high frequency portion in the horizontal direction contained in the input image signal $S_{in}$, the high frequency portion of the frequency component in the vertical direction of the input image signal $S_{in}$. Also, at the preceding stage of the vertical sharpening processing unit FEv, preferably, the two-dimensional filter is disposed to remove, at least from the high frequency portion in the vertical direction contained in the input image signal $S_{in}$, the high frequency portion of the frequency component in the horizontal direction of the input image signal $S_{in}$. Note that the high frequency portion or the high frequency domain mentioned herein is removed or attenuated in order to prevent generation of the high frequency component that is caused by the sharpening processing in a region at a high frequency both in the horizontal direction and the vertical direction and causes the glitter. The high frequency portion or the high frequency domain, in consideration of the sharpening characteristics of the sharpening processing units (FEv and FEh) disposed at a subsequent stage of each two-dimensional filter, may be appropriately determined by those who are skilled in the art.

Further, another two-dimensional filter may be disposed at a subsequent stage of the second adder 16 in order to further ensure the attenuation of the high frequency component. Preferably, this two-dimensional filter removes a region of the frequency component of the output image signal $S_{out}$ at a high frequency in both the horizontal direction and the vertical direction.

(Second Embodiment)

Figure 9:
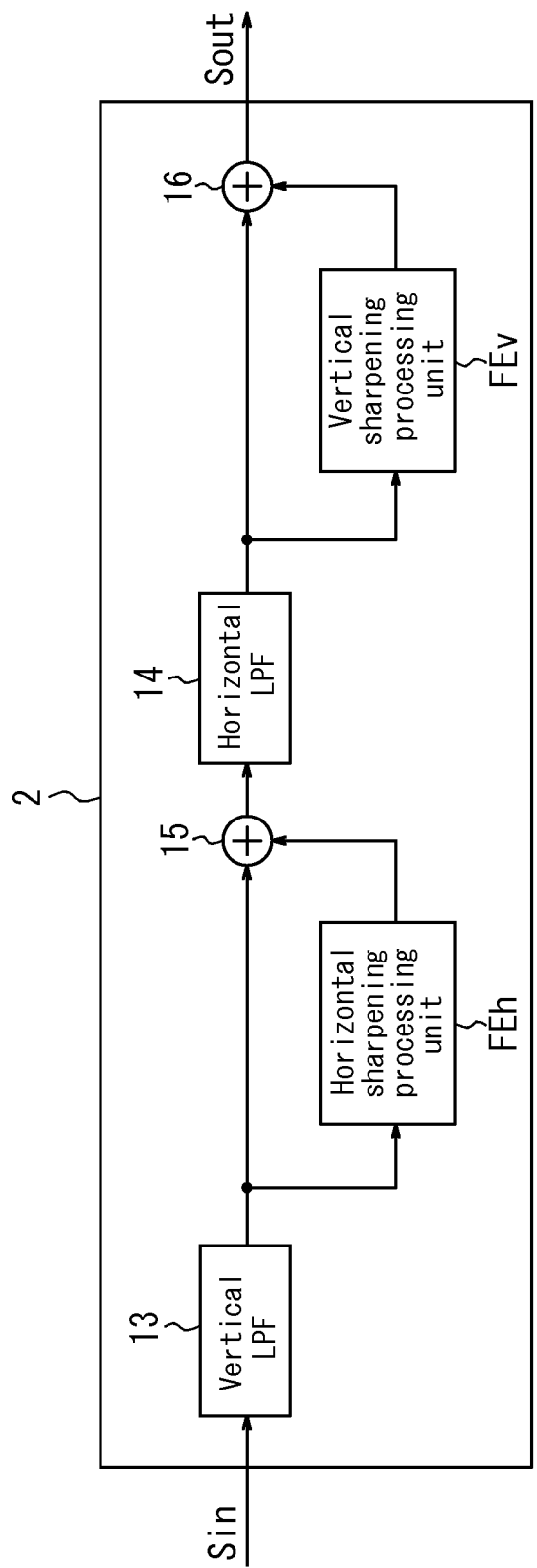
FIG. 9 is a diagram illustrating a configuration of an image processing apparatus according to a second embodiment.

FIG. 9 is a diagram illustrating a configuration of an image processing apparatus 2 according to a second embodiment. The image processing apparatus 2 includes functional blocks similar to those of the image processing apparatus 1 according to the first embodiment but has different arrangements of the vertical LPF 13 and the horizontal LPF 14. Although each functional block will be described, a function thereof the same as that of the first embodiment will be omitted.

According to the present embodiment, since the input image signal $S_{in}$ passes through the vertical LPF 13 and the horizontal LPF 14, each of the LPFs may remove the high frequency domain for the sharpening processing and, also, attenuate the high frequency component contained in the input image signal $S_{in}$. This configuration is particularly effective when the noise reduction is necessary for the entire input image signal $S_{in}$ such as when the high frequency component of the input image signal $S_{in}$ contains a number of noises.

Note that, similarly to the first embodiment, the image processing apparatus 2 may alter the order of the sharpening processing in the horizontal direction and the sharpening processing in the vertical direction. Also, in place of the vertical LPF 13 and the horizontal LPF 14, two-dimensional filters corresponding thereto may be used. Further, the two-dimensional filter may be disposed at the subsequent stage of the second adder 16 in order to further ensure the attenuation of the high frequency component.

(Third Embodiment)

Figure 10:
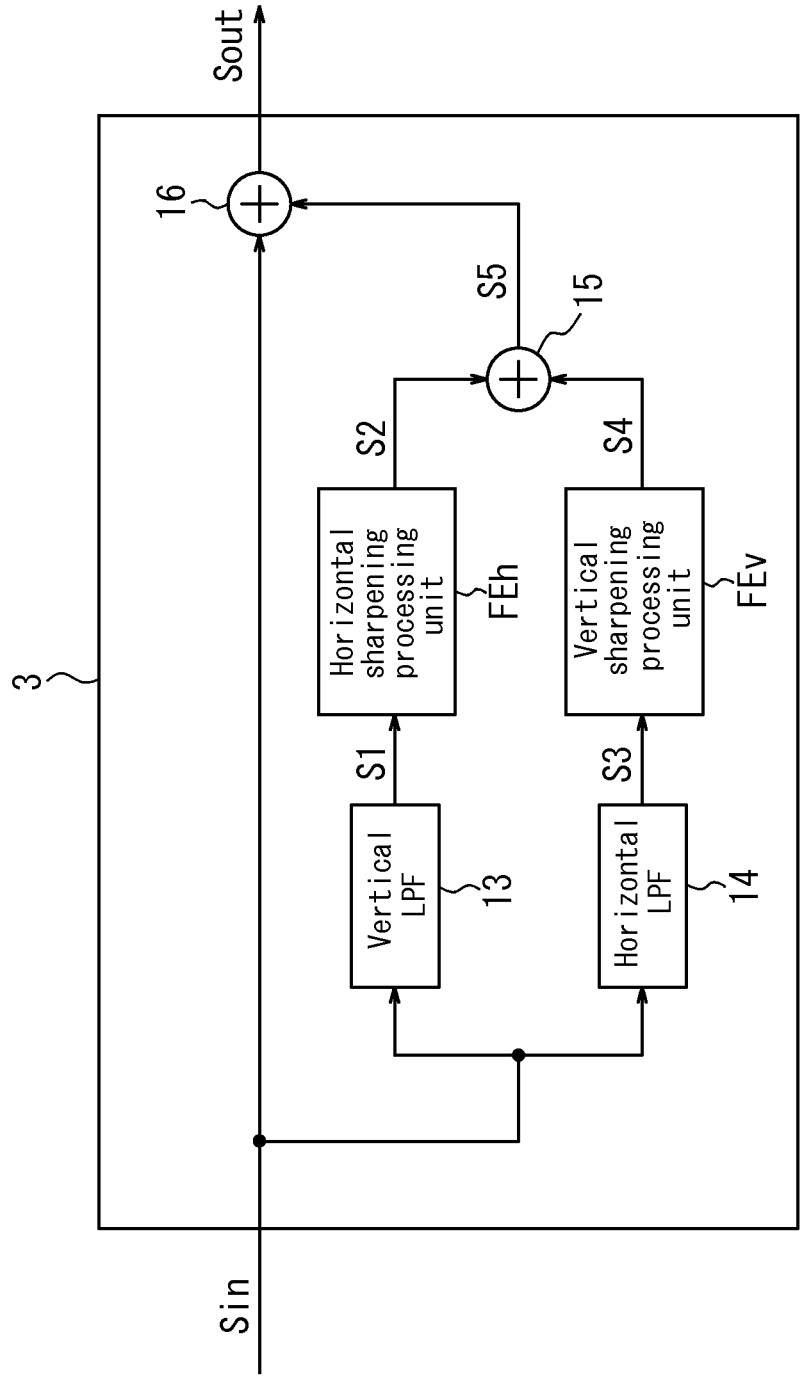
FIG. 10 is a diagram illustrating a configuration of an image processing apparatus according to a third embodiment.

FIG. 10 is a diagram illustrating a configuration of an image processing apparatus 3 according to a third embodiment. The image processing apparatus 3 includes the vertical LPF 13, the horizontal LPF 14, the horizontal sharpening processing unit FEh, the vertical sharpening processing unit FEv, the first adder 15, and the second adder 16. The image processing apparatus 3 includes the horizontal direction processing unit in which the vertical LPF 13 is disposed at a preceding stage of the horizontal sharpening processing unit FEh and the vertical direction processing unit in which the horizontal LPF 14 is disposed at a preceding stage of the vertical sharpening processing unit FEv. The horizontal direction processing unit and the vertical direction processing unit are connected in parallel. FIG. 11 are diagrams illustrating the frequency component of the signal output by each functional block of the image processing apparatus 3. The following is a description of an operation of each functional block in association with the frequency component in FIG. 11.

The vertical LPF 13 removes the high frequency component of the frequency component in the vertical direction of the input image signal $S_{in}$. The vertical LPF 13 partially attenuates the high frequency domain of the frequency component in the vertical direction of the input image signal $S_{in}$ and outputs the first signal S1 thus obtained to the horizontal sharpening processing unit FEh. FIG. 11B is a diagram illustrating the frequency component of the first signal S1. The vertical LPF 13 attenuates the high frequency domain of the frequency component in the vertical direction. Note that the high frequency portion or the high frequency domain mentioned herein is removed or attenuated in order to prevent generation of the high frequency component that is caused by the sharpening processing in a region at a high frequency both in the horizontal direction and the vertical direction and causes the glitter. The high frequency portion or the high frequency domain, in consideration of the sharpening characteristics of the horizontal sharpening processing unit FEh disposed at a subsequent stage, may be appropriately determined by those who are skilled in the art.

The horizontal sharpening processing unit FEh generates the harmonic in the horizontal direction containing the frequency component higher than the frequency component in the horizontal direction contained in the input image signal $S_{in}$. The horizontal sharpening processing unit FEh carries out the sharpening processing in the horizontal direction of the image represented by the first signal S1 received from the vertical LPF 13 and outputs the second signal S2 thus obtained to the first adder 15. FIG. 11C is a diagram illustrating the frequency component of the second signal S2. The horizontal sharpening processing unit FEh generates the harmonic in the horizontal direction containing the frequency component exceeding the Nyquist frequency in the horizontal direction.

The horizontal LPF 14 removes the high frequency component of the frequency component in the horizontal direction of the input image signal $S_{in}$. The horizontal LPF 14 partially attenuates the high frequency domain of the frequency component in the horizontal direction of the input image signal $S_{in}$ and outputs the third signal S3 thus obtained to the vertical sharpening processing unit FEv. FIG. 11D is a diagram illustrating the frequency component of the third signal S3. The horizontal LPF 14 attenuates the high frequency domain of the frequency component in the horizontal direction. Note that the high frequency portion or the high frequency domain mentioned herein is removed or attenuated in order to prevent generation of the high frequency component that is caused by the sharpening processing in a region at a high frequency both in the horizontal direction and the vertical direction and causes the glitter. The high frequency portion or the high frequency domain, in consideration of the sharpening characteristics of the vertical sharpening processing unit FEv disposed at a subsequent stage, may be appropriately determined by those who are skilled in the art.

The vertical sharpening processing unit FEv generates the harmonic in the vertical direction containing the frequency component higher than the frequency component in the vertical direction contained in the input image signal $S_{in}$. The vertical sharpening processing unit FEv carries out the sharpening processing in the vertical direction of the image represented by the third signal S3 received from the horizontal LPF 14 and outputs the fourth signal S4 thus obtained to the first adder 15. FIG. 11E is a diagram illustrating the frequency component of the fourth signal S4. The vertical sharpening processing unit FEv generates the harmonic in the vertical direction containing the frequency component exceeding the Nyquist frequency in the vertical direction.

The first adder 15 generates the fifth signal S5 by combining the second signal S2 received from the horizontal sharpening processing unit FEh with the fourth signal S4 received from the vertical sharpening processing unit FEv. FIG. 11F is a diagram illustrating the frequency component of the fifth signal S5.

The second adder 16 generates the output image signal $S_{out}$ by combining the input image signal $S_{in}$ with the fifth signal S5 received from the first adder 15. FIG. 11G is a diagram illustrating the frequency component of the output image signal $S_{out}$. The output image signal $S_{out}$ is obtained by adding, to the frequency component of the input image signal $S_{in}$, the harmonic containing the frequency component exceeding the Nyquist frequency in the horizontal direction and in the vertical direction. Especially, no frequency component exceeding the Nyquist frequency is generated in the range at a high frequency in the horizontal direction and in the vertical direction.

According to the present embodiment, as described above, since the vertical LPF 13 is disposed at the preceding stage of the horizontal sharpening processing unit FEh and the horizontal LPF 14 is disposed at the preceding stage of the vertical sharpening processing unit FEv, the image may be sharpened without generating, in the frequency domain exceeding the frequency component in both the horizontal direction and the vertical direction of the input image, the frequency component caused by the sharpening operation in both the horizontal direction and the vertical direction in the overlapping manner, thereby reducing the glitter/flicker of the image. Also, since the method of the present embodiment may separately select the filter (including the two-dimensional filter described later) particularly for the bandwidth necessary for the generation of the harmonic in the horizontal direction and the harmonic in the vertical direction, an excellent harmonic may be obtained in each of the horizontal direction and the vertical direction without causing the noise. Therefore, a sharp image may be obtained.

Note that the image processing apparatus 3 may have another two-dimensional filter at the subsequent stage of the second adder 16, in order to further ensure the attenuation of the high frequency component. Preferably, this two-dimensional filter removes the range at a high frequency in both the horizontal direction and the vertical direction of the frequency component of the output image signal $S_{out}$.

(Fourth Embodiment)

Figure 12:
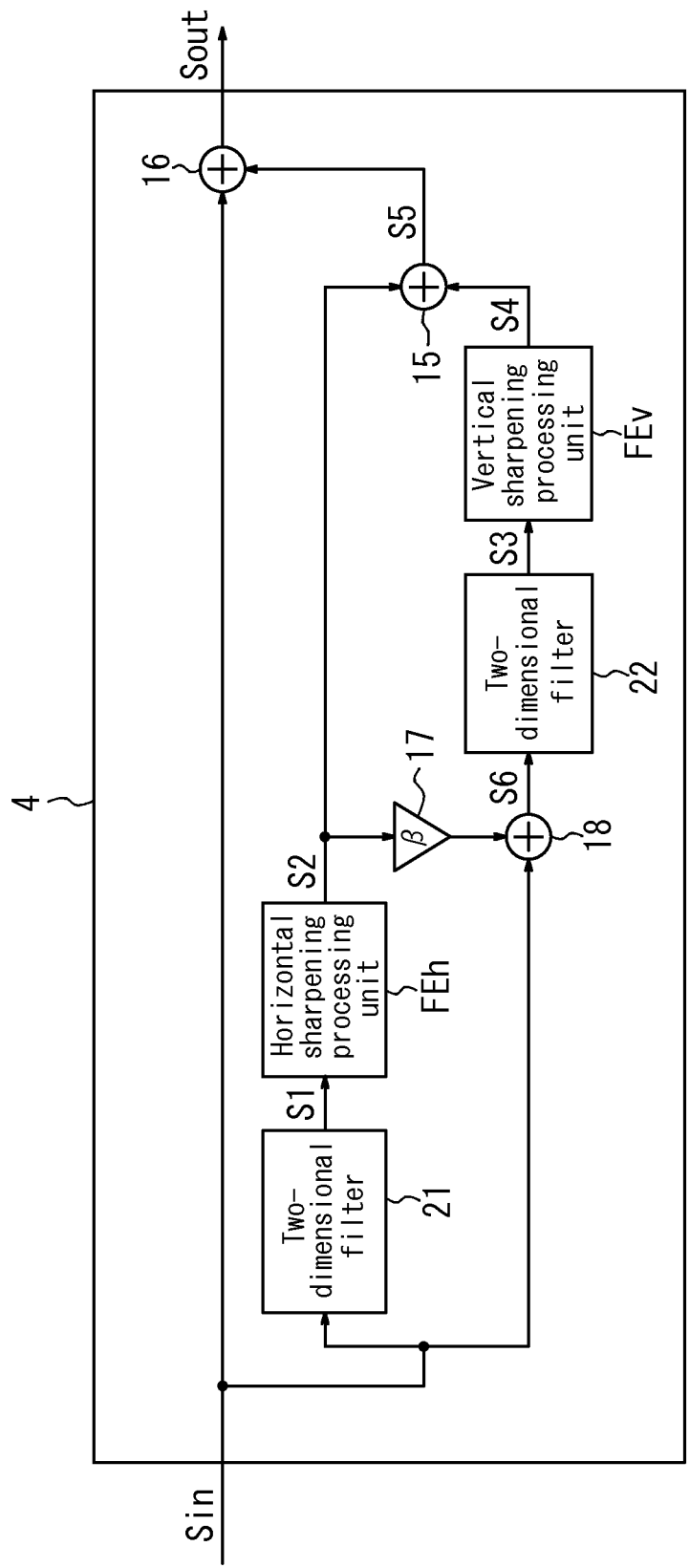
FIG. 12 is a diagram illustrating a configuration of an image processing apparatus according to a fourth embodiment.

FIG. 12 is a diagram illustrating a configuration of an image processing apparatus 4 according to a fourth embodiment. The image processing apparatus 4 according to the fourth embodiment includes a first two-dimensional filter 21, a second two-dimensional filter 22, the horizontal sharpening processing unit FEh, the vertical sharpening processing unit FEv, an amplifier (a switch) 17, the first adder 15, the second adder 16, and a third adder 18. The image processing apparatus 4 includes the horizontal direction processing unit in which the first two-dimensional filter 21 is disposed at a preceding stage of the horizontal sharpening processing unit FEh and the vertical direction processing unit in which the second two-dimensional filter 22 is disposed at a preceding stage of the vertical sharpening processing unit FEv. The switch (the amplifier) 17 is connected to the subsequent stage of the horizontal direction processing unit and the preceding stage of the vertical direction processing unit and configured to switch over between the parallel connection and the series connection of the horizontal direction processing unit and the vertical direction processing unit based on a setting (amplification factor β) of the amplifier 17. Note that, as described later, since the amplification factor β of the amplifier 17 takes a value within a range of 0≤β≤1, when the amplification factor is within a range of 0<β<1, the amplifier 17 does not need to switch over to either one of the parallel connection and the series connection but may allow the circuit to include each of the parallel connection and the series connection.

Figure 13A:
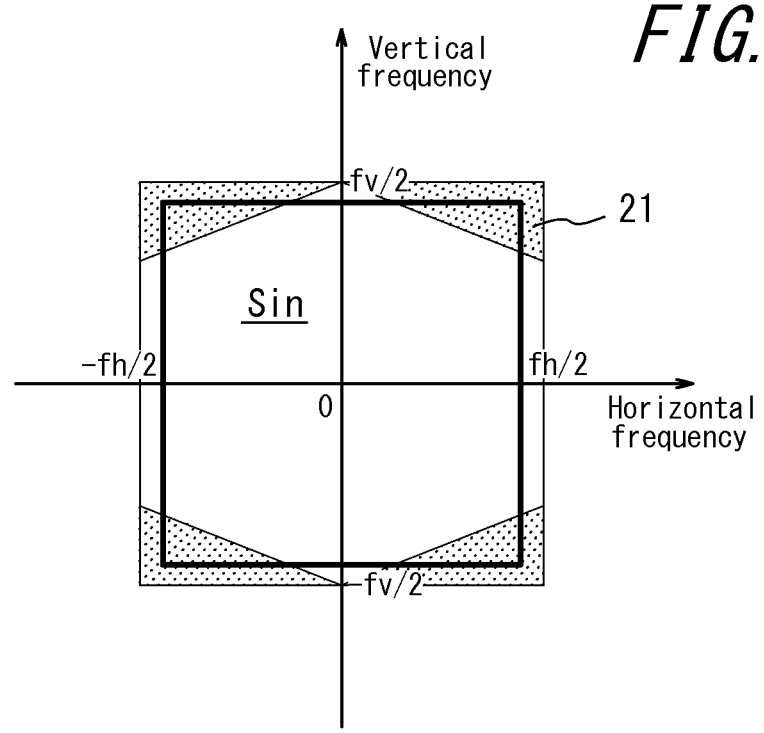
FIGS. 13A to 13B are diagrams illustrating frequency characteristics of a two-dimensional filter according to the fourth embodiment.
Figure 13B:
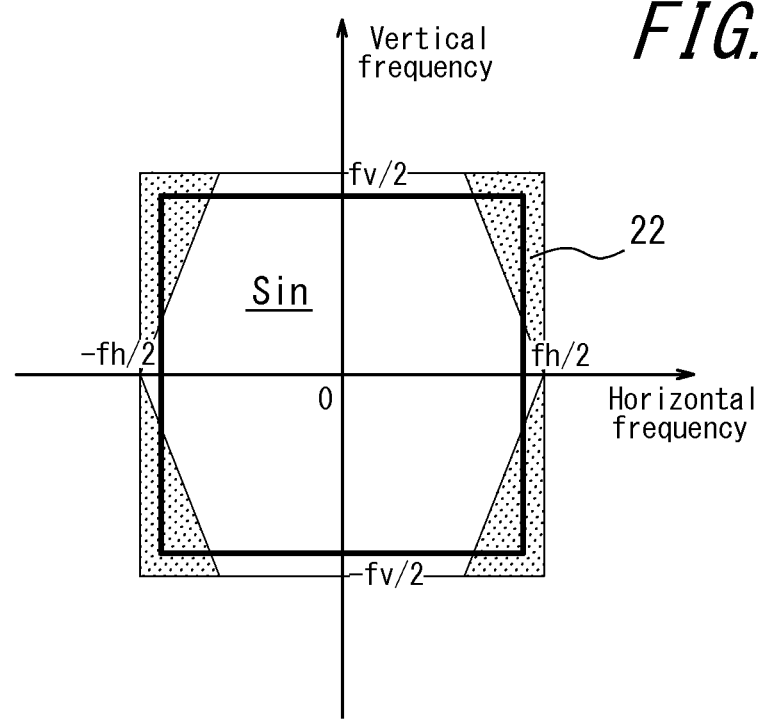

FIG. 13 are diagrams illustrating frequency characteristics of preferable two-dimensional filters according to the present embodiment. FIG. 13A illustrates the frequency characteristics of the first two-dimensional filter 21, and FIG. 13B illustrates the frequency characteristics of the second two-dimensional filter 22. The first two-dimensional filter 21 and the second two-dimensional filter 22 have characteristic to allow generation of an effective harmonic in sharpening processing described later carried out on the signal component near limits of the Nyquist frequency at four corners of a two-dimensional frequency spectrum of the input image signal $S_{in}$. The first two-dimensional filter 21, at least from the high frequency component in the horizontal direction contained in the input image signal $S_{in}$, removes the high frequency portion of the high frequency component in the vertical direction of the input image signal $S_{in}$. Also, the second two-dimensional filter 22, at least from the high frequency component in the vertical direction contained in the input image signal $S_{in}$, removes the high frequency portion of the high frequency component in the horizontal direction of the input image signal $S_{in}$. Note that the high frequency portion or the high frequency domain mentioned herein is removed or attenuated in order to prevent generation of the high frequency component that is caused by the sharpening processing in a region at a high frequency both in the horizontal direction and the vertical direction and causes the glitter. The high frequency portion or the high frequency domain, in consideration of the sharpening characteristics of the sharpening processing units (FEv and FEh) disposed at subsequent stages of the respective two-dimensional filters, may be appropriately determined by those who are skilled in the art.

The amplification factor of the amplifier 17 may be set within the range of β≤1. When the amplification factor is 0, the image processing apparatus 4 has a configuration in which, similarly to the third embodiment, the sharpening processing in the horizontal direction and the sharpening processing in the vertical direction are carried out in parallel. When the amplification factor is 1, the image processing apparatus 4 has a configuration in which, similarly to the first embodiment, the sharpening processing in the horizontal direction and the sharpening processing in the vertical direction are carried out in series. When the amplification factor is within the range of 0<β<1, the frequency component is generated by the processing carried out in series and, also, the frequency component is generated by the processing in parallel. Therefore, setting the amplification factor β according to the characteristics of the input image signal $S_{in}$ allows more appropriate sharpening processing by using a combination of the frequency component generated by the processing in series and the frequency component generated by the processing in parallel.

FIG. 14 are diagrams illustrating the frequency component of the signal output by each functional block when the amplification factor β of the amplifier 17 is 0.

The first two-dimensional filter 21, at least from the high frequency portion in the horizontal direction contained in the input image signal $S_{in}$, removes the high frequency portion of the frequency component in the vertical direction of the input image signal $S_{in}$. The first two-dimensional filter 21 partially attenuates the high frequency domain of the frequency component in the vertical direction of the input image signal $S_{in}$ and outputs the first signal S1 thus obtained to the horizontal sharpening processing unit FEh. FIG. 14B is a diagram illustrating the frequency component of the first signal S1. The first two-dimensional filter 21 attenuates the high frequency domain of the frequency component in the vertical direction.

The horizontal sharpening processing unit FEh generates the harmonic in the horizontal direction containing the frequency component higher than the frequency component in the horizontal direction contained in the input image signal $S_{in}$. The horizontal sharpening processing unit FEh carries out the sharpening processing in the horizontal direction of the image represented by the first signal S1 received from the first two-dimensional filter 21 and outputs the second signal S2 thus obtained to the first adder 15 and the amplifier 17. FIG. 14C is a diagram illustrating the frequency component of the second signal S2. The horizontal sharpening processing unit FEh generates the harmonic in the horizontal direction containing the frequency component exceeding the Nyquist frequency in the horizontal direction.

Although the amplifier 17 multiples the second signal S2 by the amplification factor β(=0), since the amplification factor β is 0, the signal is not output to the third adder 18.

The second two-dimensional filter 22, at least from the high frequency portion in the vertical direction contained in the input image signal $S_{in}$, removes the high frequency portion of the frequency component in the horizontal direction of the input image signal $S_{in}$. The second two-dimensional filter 22 partially attenuates the high frequency domain of the frequency component in the horizontal direction of a sixth signal S6 corresponding to the input image signal $S_{in}$ and outputs the third signal S3 to the vertical sharpening processing unit FEv. FIG. 14D is a diagram illustrating the frequency component of the third signal S3. The second two-dimensional filter 22 attenuates the high frequency domain of the frequency component in the horizontal direction.

The vertical sharpening processing unit FEv generates the harmonic in the vertical direction containing the frequency component higher than the frequency component in the vertical direction contained in the input image signal $S_{in}$. The vertical sharpening processing unit FEv carries out the sharpening processing in the vertical direction of the image represented by the third signal S3 received from the second two-dimensional filter 22 and outputs the fourth signal S4 thus obtained to the first adder 15. FIG. 14E is a diagram illustrating the frequency component of the fourth signal S4. The vertical sharpening processing unit FEv generates the harmonic in the vertical direction containing the frequency component exceeding the Nyquist frequency in the vertical direction.

The first adder 15 generates the fifth signal S5 by combining the second signal S2 received from the horizontal sharpening processing unit FEh with the fourth signal S4 received from the vertical sharpening processing unit FEv. FIG. 14F is a diagram illustrating the frequency component of the fifth signal S5.

The second adder 16 generates the output image signal $S_{out}$ by combining the input image signal $S_{in}$ and the fifth signal S5 received from the first adder 15. FIG. 14G is a diagram illustrating the frequency component of the output image signal $S_{out}$. The output image signal $S_{out}$ is obtained by adding, to the frequency component of the input image signal $S_{in}$, the harmonic containing the frequency component exceeding the Nyquist frequency in the horizontal direction and in the vertical direction. Especially, no frequency component exceeding the Nyquist frequency is generated in the region at a high frequency in both the horizontal direction and the vertical direction. Also, in a region at a high frequency in both the horizontal direction and the vertical direction equal to or lower than the Nyquist frequency, the harmonic in the horizontal direction and the harmonic in the vertical direction are reasonably prevented from overlapping with each other.

FIG. 15 are diagrams illustrating the frequency component of the signal output by each functional block when the amplification factor of the amplifier 17 is 1.

The first two-dimensional filter 21, at least from the high frequency portion in the horizontal direction contained in the input image signal $S_{in}$, removes the high frequency portion of the frequency component in the vertical direction of the input image signal $S_{in}$. The first two-dimensional filter 21 partially attenuates the high frequency domain of the frequency component in the vertical direction of the input image signal $S_{in}$ and outputs the first signal S1 to the horizontal sharpening processing unit FEh. FIG. 15B is a diagram illustrating the frequency component of the first signal S1. The first two-dimensional filter 21 attenuates the high frequency domain of the frequency component in the vertical direction.

The horizontal sharpening processing unit FEh generates the harmonic in the horizontal direction containing the frequency component higher than the frequency component in the horizontal direction contained in the input image signal $S_{in}$. The horizontal sharpening processing unit FEh carries out the sharpening processing in the horizontal direction of the image represented by the first signal S1 received from the first two-dimensional filter 21 and outputs the second signal S2 thus obtained to the first adder 15 and the amplifier 17. FIG. 15C is a diagram illustrating the frequency component of the second signal S2. The horizontal sharpening processing unit FEh generates the harmonic in the horizontal direction containing the frequency component exceeding the Nyquist frequency in the horizontal direction.

The amplifier 17 multiplies the second signal S2 by the amplification factor β(=1) and outputs a signal thus obtained to the third adder 18.

The third adder 18 generates the sixth signal S6 by combining the input image signal $S_{in}$ with the second signal S2. FIG. 15D is a diagram illustrating the frequency component of the sixth signal S6. The sixth signal S6 is obtained by adding, to the frequency component of the input image signal $S_{in}$, the harmonic in the horizontal direction containing the frequency component exceeding the Nyquist frequency in the horizontal direction. Especially, no harmonic in the horizontal direction containing the frequency component exceeding the Nyquist frequency in the horizontal direction is generated in the high frequency domain in the vertical direction.

The second two-dimensional filter 22, at least from the high frequency portion in the vertical direction contained in the sixth signal S6 (the input image signal $S_{in}$+the second signal S2), removes the high frequency portion of the frequency component in the horizontal direction of the sixth signal S6 (the input image signal $S_{in}$+the second signal S2). The second two-dimensional filter 22 partially attenuates the high frequency domain of the frequency component in the horizontal direction of the sixth signal S6 (the input image signal $S_{in}$+the second signal S2) and outputs the third signal S3 thus obtained to the vertical sharpening processing unit FEv. FIG. 15E is a diagram illustrating the frequency component of the third signal S3. The second two-dimensional filter 22 attenuates the high frequency domain of the frequency component in the horizontal direction.

The vertical sharpening processing unit FEv generates the harmonic in the vertical direction containing the frequency component higher than the frequency component in the vertical direction contained in the sixth signal S6 that contains the input image signal $S_{in}$. The vertical sharpening processing unit FEv carries out the sharpening processing in the vertical direction of the image represented by the third signal S3 received from the second two-dimensional filter 22 and outputs the fourth signal S4 thus obtained to the first adder 15. FIG. 15F is a diagram illustrating the frequency component of the fourth signal S4. The vertical sharpening processing unit FEv generates the harmonic in the vertical direction containing the frequency component exceeding the Nyquist frequency in the vertical direction.

The first adder 15 generates the fifth signal S5 by combining the second signal S2 received from the horizontal sharpening processing unit FEh with the fourth signal S4 received from the vertical sharpening processing unit FEv. FIG. 15G is a diagram illustrating the frequency component of the fifth signal S5.

The second adder 16 generates the output image signal $S_{out}$ by combining the input image signal $S_{in}$ with the fifth signal S5 received from the first adder 15. FIG. 15H is a diagram illustrating the frequency component of the output image signal $S_{out}$. The output image signal $S_{out}$ is obtained by adding, to the frequency component of the input image signal $S_{in}$, the frequency component exceeding the Nyquist frequency in the horizontal direction and the vertical direction. Especially, no frequency component exceeding the Nyquist frequency is generated in a region at a high frequency in both the horizontal direction and the vertical direction and, in a range at a high frequency in both the horizontal direction and the vertical direction equal to or lower than the Nyquist frequency, the harmonic in the horizontal direction and the harmonic in the vertical direction are reasonably prevented from overlapping with each other.

According to the present embodiment, as described above, since the first two-dimensional filter 21 is disposed at the preceding stage of the horizontal sharpening processing unit FEh and the second two-dimensional filter 22 is disposed at the preceding stage of the vertical sharpening processing unit FEv, the image may be sharpened without generating, in the frequency domain exceeding the frequency component in both the horizontal direction and the vertical direction of the input image, the frequency component caused by the sharpening operation in both the horizontal direction and the vertical direction in the overlapping manner, thereby reducing the glitter/flicker of the image. Also, since the method of the present embodiment may separately select the filter (including the two-dimensional filter) particularly for the bandwidth necessary for the generation of the harmonic in the horizontal direction and the harmonic in the vertical direction, an excellent harmonic may be obtained in each of the horizontal direction and the vertical direction without causing the noise. Therefore, a sharp image may be obtained.

Also, in the image processing apparatus 4, the amplifier 17 functioning as the switch may switch over between the series connection and the parallel connection of the horizontal direction processing unit and the vertical direction processing unit. Thereby, when the amplification factor is set to 0 and the parallel connection is selected, a total of the frequency components generated by each sharpening processing in the horizontal direction and sharpening processing in the vertical direction acts in favor of the sharpening of the image, thereby preventing generation of artificial glitter. When the amplification factor is set to 1 and the series connection is selected, even when the input image signal $S_{in}$ represents a blurred image with a slanting component removed, the high frequency component is generated in a two-dimensional manner in the horizontal direction and the vertical direction. Thereby, the sharpening processing may convert the input image for a splendid image.

Since in the image processing apparatus 4 the amplifier 17 functions as the switch for switchover between the series connection and the parallel connection, setting the amplification factor β according to the characteristics of the input image signal $S_{in}$ allows a combination of the frequency component generated by the processing carried out in series and the frequency component generated by the processing in parallel and thus more appropriate sharpening processing.

Also, the image processing apparatus 4 may alter the order of the sharpening processing in the horizontal direction and the sharpening processing in the vertical direction. Further, the two-dimensional filter may be provided at the subsequent stage of the second adder 16 in order to further ensure the attenuation of the high frequency component.

Also, since each of the adders (the adder 15, the adder 16, and the adder 18) adds the image signal in the same frame input from each path, the delay element for adjusting the timing is provided, as necessary.

Further, the switch is not limited to the amplifier 17 but may be appropriately configured by using a switch circuit and the like.

(Fifth Embodiment)

Figure 16:
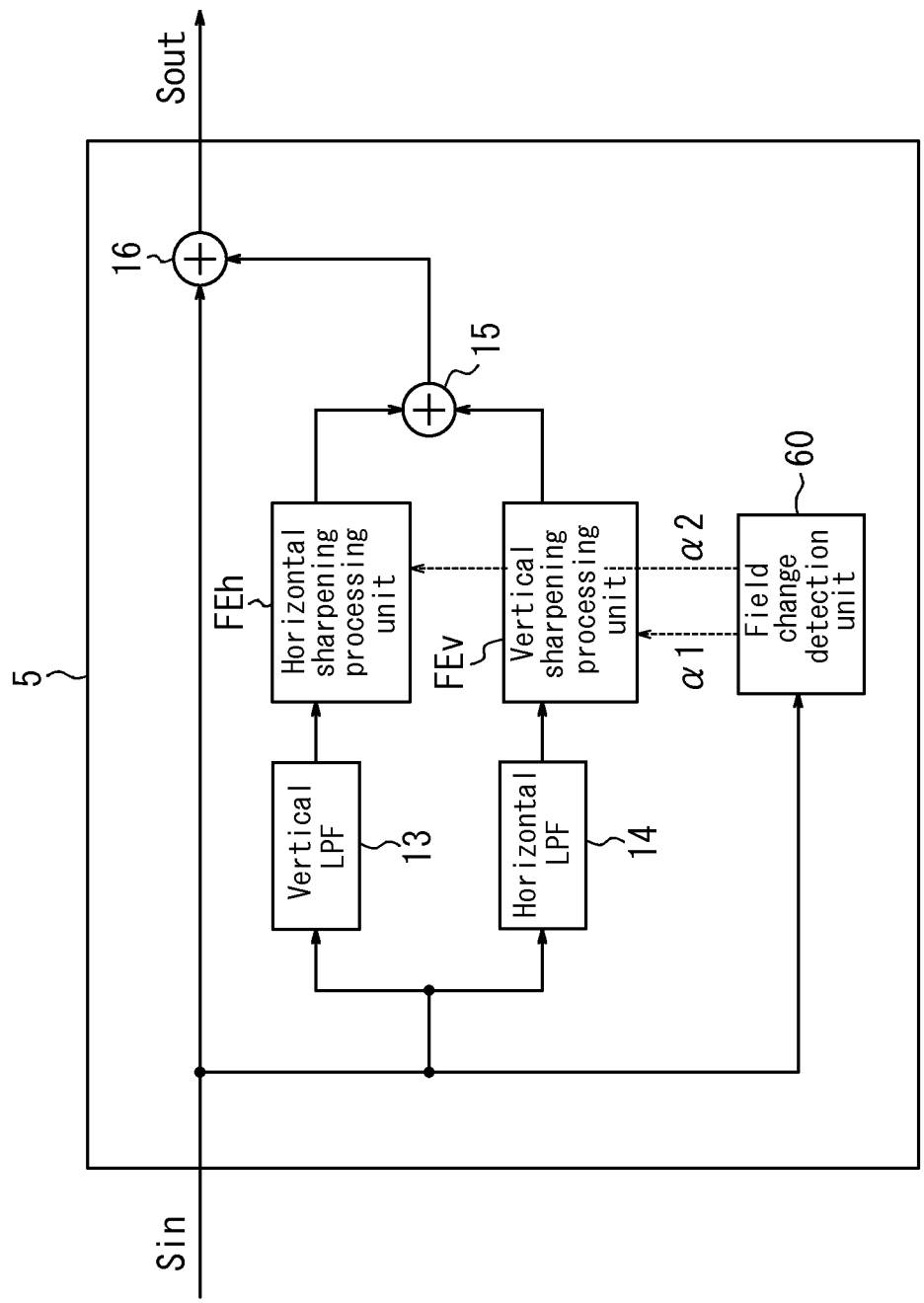
FIG. 16 is a diagram illustrating a configuration of an image processing apparatus according to a fifth embodiment.

FIG. 16 is a diagram illustrating a configuration of an image processing apparatus 5 according to a fifth embodiment. The image processing apparatus 5 according to the fifth embodiment is configured to have the image processing apparatus 3 according to the third embodiment and, in addition, a field change detection unit 60 for detecting a change amount (a field change) in the horizontal direction and in the vertical direction of the input image signal $S_{in}$. Although each functional block will be described, a function thereof the same as that of the third embodiment will be omitted.

The field change detection unit 60 according to the present embodiment detects a field change of the input image signal $S_{in}$ and adjusts an emphasis degree (a gain α) of the frequency component of the horizontal sharpening processing unit FEh and the vertical sharpening processing unit FEv. FIG. 17 illustrate configurations of the sharpening processing units FE (the horizontal sharpening processing unit FEh and the vertical sharpening processing unit FEv) according to the present embodiment. The sharpening processing unit FE illustrated in FIG. 17A has a configuration in which the amplifier 50 is disposed at a subsequent stage of the nonlinear processing unit 20 of the sharpening processing unit FE illustrated in FIG. 1. The sharpening processing unit FE illustrated in FIG. 17B has a configuration in which the amplifier 50 is disposed at a subsequent stage of the HPF 10 of the sharpening processing unit FE illustrated in FIG. 5. The amplifier 50 of the sharpening processing unit FE illustrated in FIG. 17 may change the gain based on a control signal from the field change detection unit 60. Note that in FIG. 17 the amplifier 50 is independently provided for convenience of explanation, the function (adjustment of the gain α) of the amplifier 50 may be configured integrally with the limiter 30.

Figure 18:
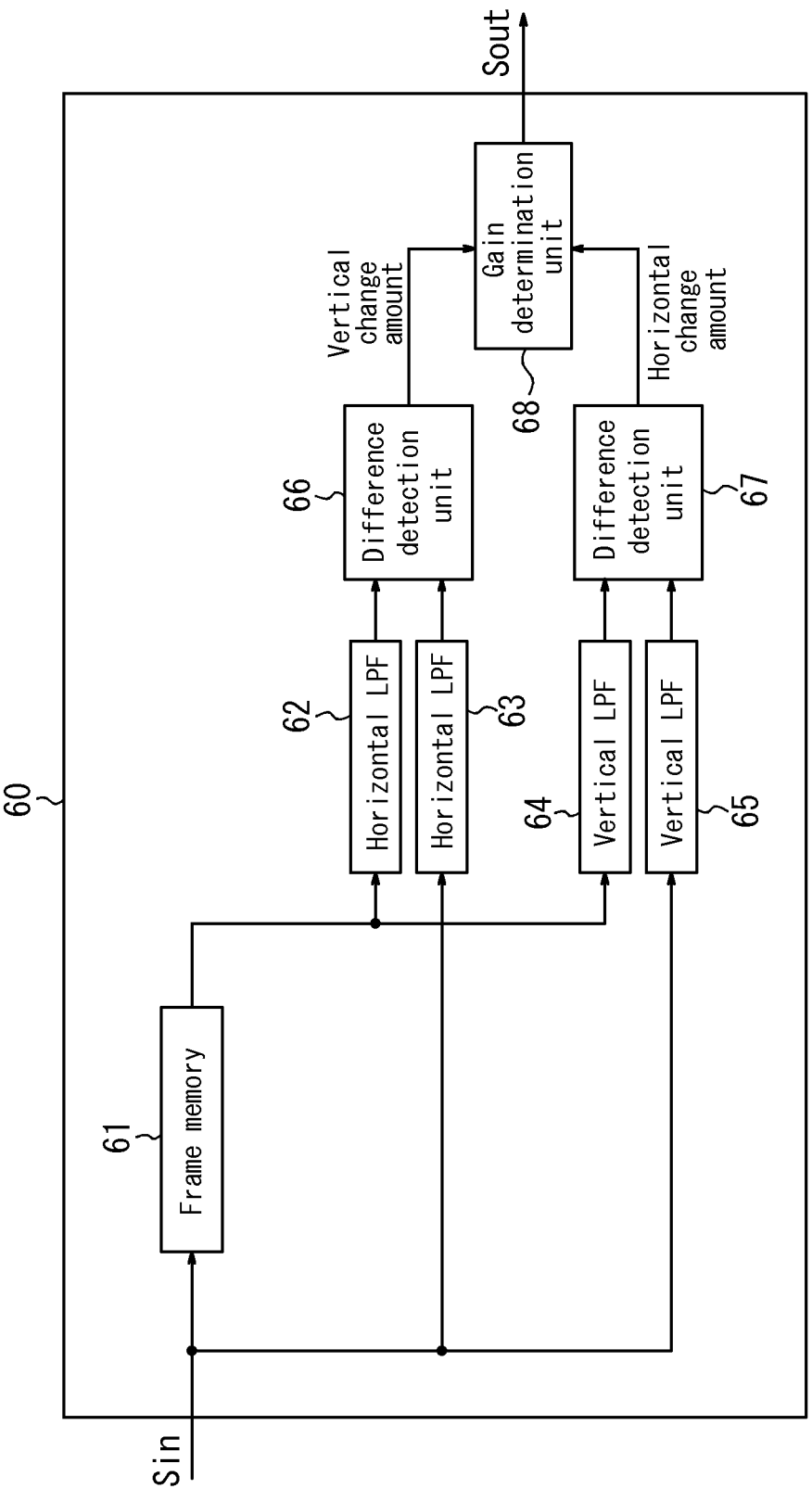
FIG. 18 is a diagram illustrating a configuration of a filed change detection unit according to the fifth embodiment.
Figure 19:
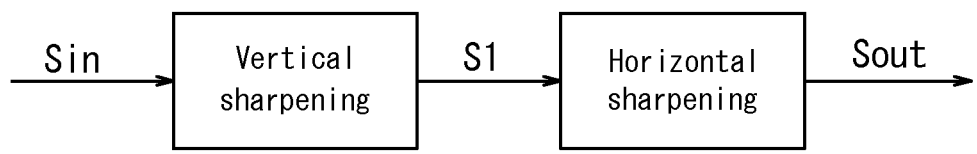
FIG. 19 is a diagram illustrating conventional sharpening processing in a horizontal direction and in a vertical direction of an image.
Figure 21:
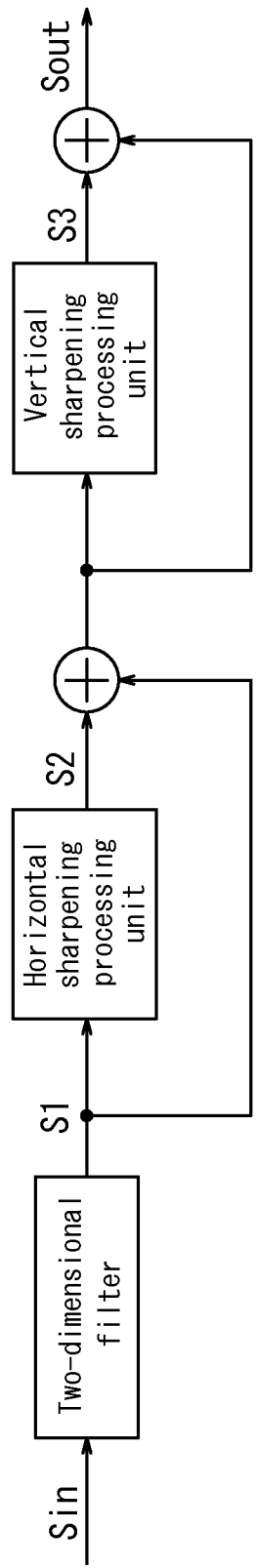
FIG. 21 is a diagram illustrating the conventional sharpening processing using the two-dimensional filter.
Figure 22:
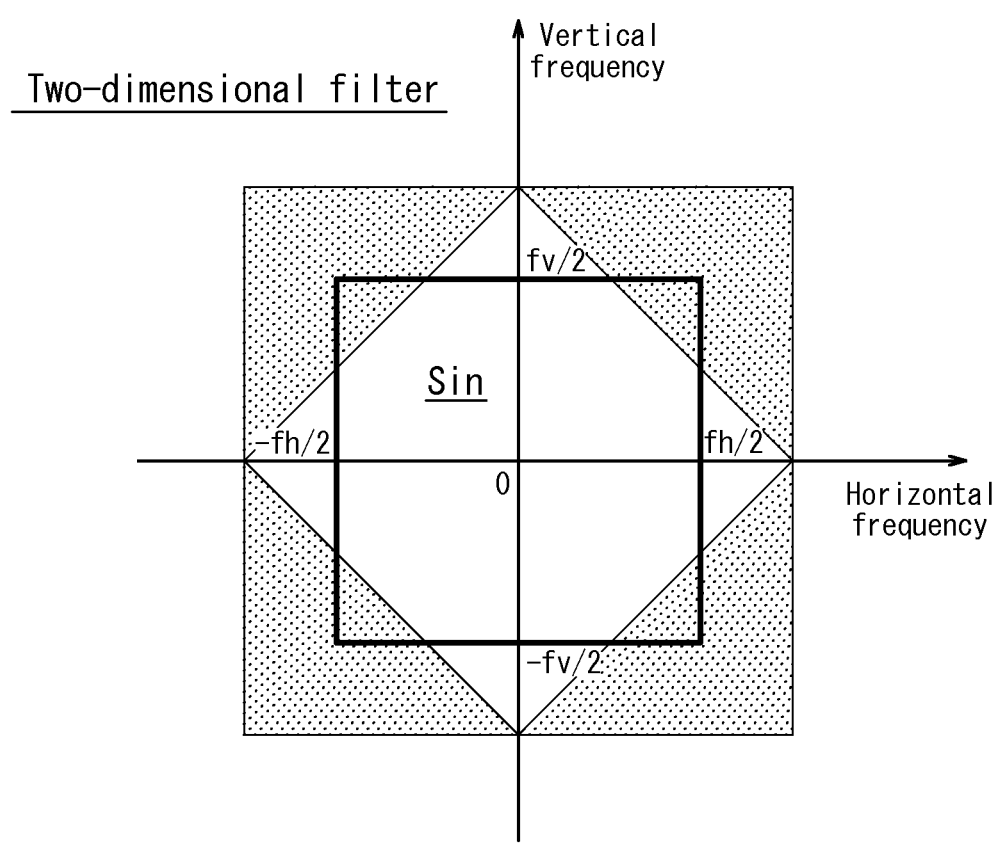
FIG. 22 is a diagram illustrating the frequency characteristics of a conventional two-dimensional filter.
Figure 23A:
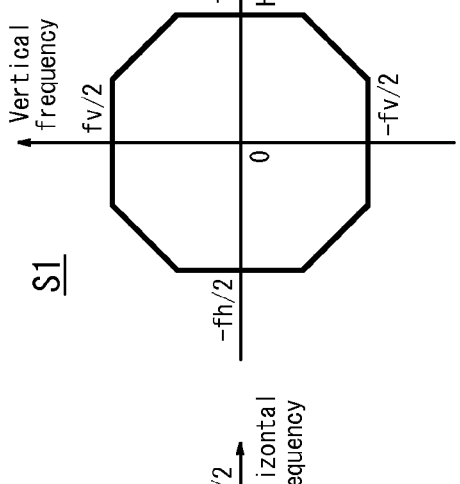
FIGS. 23A to 23E are diagrams illustrating a change of the frequency component caused by the conventional sharpening processing using the two-dimensional filter.
Figure 23B:
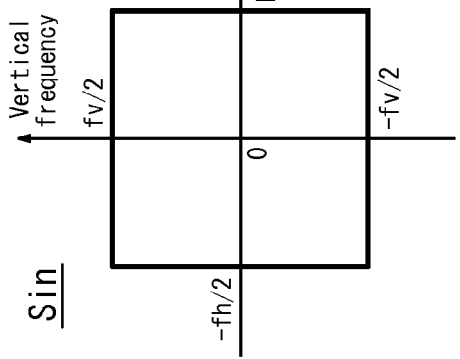
Figure 23E:
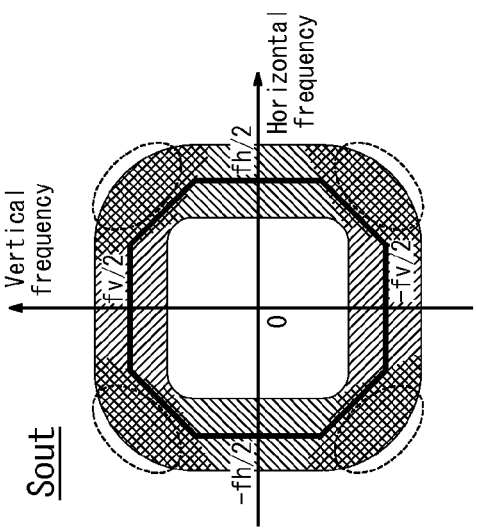
Figure 23D:
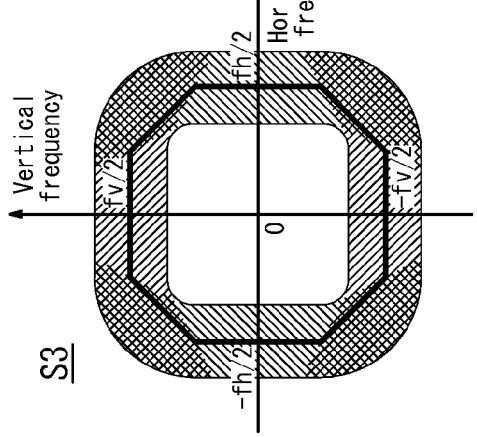
Figure 23C:
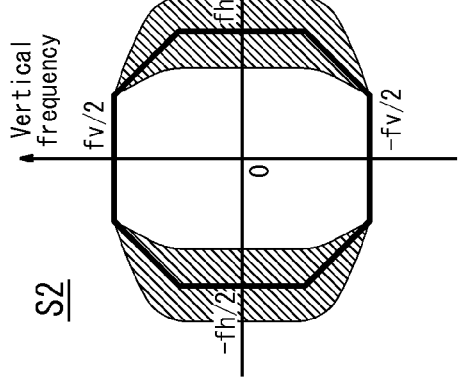

FIG. 18 is a diagram illustrating a configuration of the field change detection unit 60. The field change detection unit 60 includes a frame memory 61, a horizontal LPF 62, a horizontal LPF 63, a vertical LPF 64, a vertical LPF 65, a difference detection unit 66, a difference detection unit 67, and a gain determination unit 68.

In the field change detection unit 60, a signal of a present frame corresponding to the input image signal $S_{in}$ is input to the horizontal LPF 63 and the vertical LPF 65. Also, a signal of a previous frame output from the frame memory 61 is input to the horizontal LPF 62 and the vertical LPF 64.

The horizontal LPF 62 and the horizontal LPF 63 output signals to the difference detection unit 66, which outputs a difference signal (a vertical change amount) of each of the signals to the gain determination unit 68.

The horizontal LPF 64 and the horizontal LPF 65 output signals to the difference detection unit 67, which outputs a difference signal (a horizontal change amount) of each of the signals to the gain determination unit 68.

When a value of the vertical change amount is large, the gain determination unit 68 determines a gain al in such a manner as to lower the emphasis degree of the frequency component by the vertical sharpening processing unit FEv and outputs the gain α1 thus determined to the vertical sharpening processing unit FEv. When a value of the horizontal change amount is large, the gain determination unit 68 determines a gain α2 in such a manner as to lower the emphasis degree of the frequency component by the horizontal sharpening processing unit FEh and outputs the gain α2 thus determined to the horizontal sharpening processing unit FEh.

According to the present embodiment, as described above, since the field change detection unit 60 determines the emphasis degree of the frequency component by the sharpening processing in the horizontal direction and in the vertical direction based on the change of the input image signal $S_{in}$, the sharpening processing may be carried out in a manner matching the characteristics of the input image signal $S_{in}$.

(Description of Generation of High Frequency Component by Nonlinear Processing)

For reference, the following is a description of a mechanism in which the sharpening processing unit FE illustrated in FIG. 1 and FIG. 5 may compensate the high frequency domain exceeding the Nyquist frequency fs/2 of the input image having the sampling frequency fs.

Now, when it is assumed that the input image signal $S_{in}$ is represented by a function f(x) at a position x (in the horizontal direction) and a fundamental angular frequency of the input image signal $S_{in}$ is represented by ω, the f(x) may be expressed by a Fourier series as shown in Formula 5.

(Formula 5)

$$f(x) = a_{-N}\cos(-N)\omega x + a_{-N+1}\cos(-N+1)\omega x + \ldots + \\ a_{-1}\cos(-1)\omega x + a_0 + a_1\cos\omega x + a_2\cos 2\omega x + \ldots + \\ a_N\cos N\omega x + b_{-N}\sin(-N)\omega x + b_{-N+1}\sin(-N+1)\omega x + \ldots + \\ b_{-1}\sin(-1)\omega x + b_1\sin\omega x + b_2\sin 2\omega x + \ldots + b_N\sin N\omega x \quad (5)$$

Here, N is an order of a harmonic at the highest frequency equal to or lower than the Nyquist frequency fs/2 corresponding to the sampling frequency fs (before image enlargement processing). In other words, $$N\omega/(2\pi) < fs/2 \leq (N+1)\omega/(2\pi)$$

is satisfied.

For example, when the nonlinear processing units (20 and 40) generate the first signal S1 by squaring the input image signal $S_{in}$, each section of the first signal S1 is expressed by any one of the following Formulae 6(a) to 6(c).

(Formulae 6)

$$a_i \cos i\omega x \times a_j \cos j\omega x \quad (6a)$$

$$a_i \cos i\omega x \times b_j \sin j\omega x \quad (6b)$$

$$b_i \sin i\omega x \times b_j \sin j\omega x \quad (6c)$$

(i=±1, ±2, ..., ±N; j=±1, ±2, ..., ±N)

Using a formula of the trigonometric function, the Formulae (6a) to (6c) may be rewritten into the following Formulae (7a) to (7c), respectively.

(Formulae 7)

$$\frac{a_i a_j}{2}(\cos(i+j)\omega x + \cos(i-j)\omega x) \quad (7a)$$

$$\frac{a_i b_j}{2}(\cos(i+j)\omega x - \sin(i-j)\omega x) \quad (7b)$$

$$-\frac{b_i b_j}{2}(\sin(i+j)\omega x - \cos(i-j)\omega x) \quad (7c)$$

From the above formula, $(f(x))^2$ includes an angular frequency component such as $(N+1)\omega$, $(N+2)\omega$, ..., $2N\omega$ and the like, and thus includes the frequency component higher than the Nyquist frequency fs/2. Therefore, the first signal S1 contains the frequency component higher than the Nyquist frequency fs/2 in a manner similar to the harmonic component such as a frequency $2N\omega/(2\pi)$.

Also, for example, when the nonlinear processing units (20 and 40) generate the second signal S2 by raising a positive first signal S1 to the third power, each section of the second signal S2 is expressed by any one of the following formulae (8a) to (8d).

(Formulae 8)

$$a_i \cos i\omega x \times a_j \cos j\omega x \times a_k \cos k\omega x \quad (8a)$$

$$a_i \cos i\omega x \times a_j \cos j\omega x \times b_k \sin k\omega x \quad (8b)$$

$$a_i \cos i f x \times b_j \sin j\omega w \times b_k \sin k\omega x \quad (8c)$$

$$b_i \sin i\omega x \times b_j \text{six} j\omega x \times b_k \sin k\omega x \quad (8d)$$

(i=±1, ±2, ..., ±N; j=±1, ±2, ..., ±N; k=±1, ±2, ..., ±N)

Now, focusing on the sections set forth below expressed by the above Formulae (8a) and (8d) in the sections of i=j=k=N, these sections may be rewritten into the following formulae by using the formula of the trigonometric function.

(Formulae 9)

$$(a_N \cos N\omega x)^3 = a_N^3 \{(3/4)\cos N\omega x + (1/4)\cos 3N\omega x\} \quad (9a)$$

$$(a_N \sin N\omega x)^3 = b_N^3 \{(3/4)\sin N\omega x - (1/4)\sin 3N\omega x\} \quad (9d)$$

Also, focusing on the sections set forth below expressed by the above Formulae (8a) and (8d) in the sections of i=j=k=–N, these sections may be rewritten into the following formulae by using the formula of the trigonometric function.

(Formulae 10)

$$\{a_N \cos(-N\omega x)\}^3 = a_N^3 \{(3/4)\cos(-N\omega N) + (1/4)\cos(-3N\omega N)\} \quad (10a)$$

$$\{a_N \sin(-N\omega N)\}^3 = b_N^3 \{(3/4)\sin(-N\omega x) - (1/4)\sin(-3N\omega x)\} \quad (10d)$$

From the above Formulae (9a), (9d), (10a), and (10d), $(g(x))^3$ includes the frequency components of 3N times of, and –3N times of, the fundamental angular frequency $\omega$. By rewriting other sections of $(g(x))^3$ using the formula of the trigonometric function, it can be seen that $(g(x))^3$ includes various frequency components from –3N times to 3N times of the fundamental angular frequency $\omega$.

As described above, because of the nonlinear processing carried out by the nonlinear processing units (20 and 40), the sharpening processing unit FE may compensate the high frequency domain exceeding the Nyquist frequency fs/2 of the input image having the sampling frequency fs. Also, the nonlinear processing unit 20 for using the asymmetric nonlinear function, by carrying out the nonlinear processing that is asymmetric in the positive region and the negative region of the signal subjected to the high pass filter, may generate the frequency component asymmetric between the positive region and the negative region.

INDUSTRIAL APPLICABILITY

Our image processing apparatus and image processing method are intended to be applied to the image processing apparatus for improving image quality by sharpening an image, and applicable to, for example, the image processing apparatus for sharpening the video that is displayed in real time on a television (TV) receiver.

Our image processing apparatus and image processing method are applicable also to image sharpening processing of a monitoring camera and, for example, capable of reducing blur in an enlarged portion of an image. Also, our image processing apparatus and image processing method allow for the image processing for sharpening an outline in a region with low brightness in an image captured by the monitoring camera installed in a dark position, or in an image taken at night.

Our image processing apparatus and image processing method are applicable also to resolution enhancement of an image captured from a distance. For example, an image of an accident site difficult to access taken from a distance, or a satellite image may be processed with the image processing for sharpening the outline.

Our image processing apparatus and image processing method are applicable also to high-definition conversion of analog contents. That is, in order to convert existing analog contents into high-definition contents, the image processing for sharpening the outline of the up-converted image is carried out. Thereby, the analog contents may be reproduced as digital contents with higher definition. Our image processing apparatus and image processing method are applicable to, for example, conversion of the analog television contents into high-resolution contents, and conversion of contents of an old movie into digital contents with higher definition (for example, Blu-ray (registered trademark) contents).

Also, our image processing apparatus and image processing method are applicable to a medical field. For example, our image processing apparatus and image processing method allow for conversion of an enlarged image of an affected site taken by an endoscope or the like into an image with higher definition image, or conversion of an image of an affected site with low resolution into an image with higher definition in the remote medical care.

Further, our image processing apparatus and image processing method are applicable to higher-definition conversion of video contents that can be viewed on a computer. On the internet, there are a number of websites for distributing video contents, and numerous video contents have already been stored. Our image processing apparatus and image processing method allow for conversion of the existing video contents into contents with higher definition and higher resolution, thereby improving viewing quality.

Although this disclosure has been described based on the figures and the embodiments, it is to be understood that various modifications and changes may be implemented based on the present disclosure by those who are ordinarily skilled in the art. Accordingly, such modifications and changes are included in a scope of this disclosure. For example, functions and the like included in each unit and each step may be rearranged without logical inconsistency, so as to combine a plurality of units or steps together or to divide them.

REFERENCE SIGNS LIST 1, 2, 3, 4, 5 image processing apparatus
10 HPF
111 to 11($m$−1) unit delay element
121 to 12$m$ multiplier
131 adder
11 LPF
12 subtracter
13 vertical LPF (vertical filter)
14 horizontal LPF (horizontal filter)
15 first adder
16 second adder
17 amplifier (switch)
18 third adder
20, 40 nonlinear processing unit
21 first two-dimensional filter (vertical filter)
22 second two-dimensional filter (horizontal filter)
30 limiter
50 amplifier
60 field change detection unit
61 frame memory
62, 63 horizontal LPF
64, 65 vertical LPF
66, 67 difference detection unit
68 gain determination unit

The invention claimed is:

1. An image processing apparatus for sharpening an input image by generating a frequency component higher than a frequency component contained in an input image signal representing the input image, the image processing apparatus comprising:
a vertical filter configured to remove, at least from a high frequency portion in a horizontal direction contained in the input image signal, a high frequency portion of a frequency component in a vertical direction of the input image signal;
a horizontal sharpening processing unit configured to generate a harmonic in the horizontal direction containing a frequency component higher than the frequency component in the horizontal direction contained in the input image signal;
a horizontal filter configured to remove, at least from a high frequency portion in the vertical direction contained in the input image signal, a high frequency portion of a frequency component in the horizontal direction of the input image signal; and
a vertical sharpening processing unit configured to generate a harmonic in the vertical direction containing a frequency component higher than the frequency component in the vertical direction contained in the input image signal, wherein
a horizontal direction processing unit in which the vertical filter is disposed at a preceding stage of the horizontal sharpening processing unit and a vertical direction processing unit in which the horizontal filter is disposed at a preceding stage of the vertical sharpening processing unit are connected in parallel, and an amplifier is connected to a subsequent stage of any one of the horizontal direction processing unit and the vertical direction processing unit and also to a preceding stage of the other.

2. The image processing apparatus according to claim 1, wherein an amplification factor β of the amplifier is 0≤β≤1.

3. The image processing apparatus according to claim 1, further comprising a field change detection unit configured to detect a change of the input image signal, wherein
the field detection unit lowers a degree of enhancement of the frequency component by the vertical sharpening processing unit when the input image signal significantly changes in the vertical direction, or lowers a degree of enhancement of the frequency component by the horizontal sharpening processing unit when the input image signal significantly changes in the horizontal direction.

4. The image processing apparatus according to claim 2, further comprising a field change detection unit configured to detect a change of the input image signal, wherein
the field detection unit lowers a degree of enhancement of the frequency component by the vertical sharpening processing unit when the input image signal significantly changes in the vertical direction, or lowers a degree of enhancement of the frequency component by the horizontal sharpening processing unit when the input image signal significantly changes in the horizontal direction.

5. An image processing apparatus for sharpening an input image by generating a frequency component higher than a frequency component contained in an input image signal representing the input image, the image processing apparatus comprising:
a vertical filter configured to remove, at least from a high frequency portion in a horizontal direction contained in the input image signal, a high frequency portion of a frequency component in a vertical direction of the input image signal;
a horizontal sharpening processing unit configured to generate a harmonic in the horizontal direction containing a frequency component higher than the frequency component in the horizontal direction contained in the input image signal;
a horizontal filter configured to remove, at least from a high frequency portion in the vertical direction contained in the input image signal, a high frequency portion of a frequency component in the horizontal direction of the input image signal; and
a vertical sharpening processing unit configured to generate a harmonic in the vertical direction containing a frequency component higher than the frequency component in the vertical direction contained in the input image signal, wherein
at least one of the horizontal sharpening processing unit and the vertical sharpening processing unit has: a filter unit configured to generate a first signal by removing at least a DC component of a frequency component in an input signal; a nonlinear processing unit configured to generate a second signal by carrying out, on the first signal, nonlinear processing asymmetric between a positive region and a negative region of the first signal, the nonlinear processing being represented by a continuous function made up of nonlinear processing applied to the positive region of the first signal and nonlinear processing applied to the negative region those passing through an origin and, also, configured to generate a frequency component having a frequency band asymmetric between the positive region and the negative region; and a limiter configured to generate a third signal by adjusting the second signal, and a horizontal direction processing unit in which the vertical filter is disposed at a preceding stage of the horizontal sharpening processing unit and a vertical direction processing unit in which the horizontal filter is disposed at a preceding stage of the vertical sharpening processing unit are connected in series, or in parallel.

6. The image processing apparatus according to claim 5, further comprising a field change detection unit configured to detect a change of the input image signal, wherein the field detection unit lowers a degree of enhancement of the frequency component by the vertical sharpening processing unit when the input image signal significantly changes in the vertical direction, or lowers a degree of enhancement of the frequency component by the horizontal sharpening processing unit when the input image signal significantly changes in the horizontal direction.

7. An image processing apparatus for sharpening an input image by generating a frequency component higher than a frequency component contained in an input image signal representing the input image, the image processing apparatus comprising:

a vertical filter configured to remove, at least from a high frequency portion in a horizontal direction contained in the input image signal, a high frequency portion of a frequency component in a vertical direction of the input image signal;

a horizontal sharpening processing unit configured to generate a harmonic in the horizontal direction containing a frequency component higher than the frequency component in the horizontal direction contained in the input image signal;

a horizontal filter configured to remove, at least from a high frequency portion in the vertical direction contained in the input image signal, a high frequency portion of a frequency component in the horizontal direction of the input image signal; and a vertical sharpening processing unit configured to generate a harmonic in the vertical direction containing a frequency component higher than the frequency component in the vertical direction contained in the input image signal, wherein at least one of the horizontal sharpening processing unit and the vertical sharpening processing unit has: a nonlinear processing unit configured to generate a first signal by carrying out nonlinear processing on an input signal, the nonlinear processing being represented by a nonlinear function containing the first signal in a continuous manner with respect to the input signal and, also, configured to generate a frequency component that is not contained in the input signal; a filter unit configured to generate a second signal by removing at least a DC component of a frequency component contained in the first signal; and a limiter configured to generate a third signal by adjusting the second signal, and a horizontal direction processing unit in which the vertical filter is disposed at a preceding stage of the horizontal sharpening processing unit and a vertical direction processing unit in which the horizontal filter is disposed at a preceding stage of the vertical sharpening processing unit are connected in series, or in parallel. significantly changes in the horizontal direction.

8. The image processing apparatus according to claim 7, further comprising a field change detection unit configured to detect a change of the input image signal, wherein the field detection unit lowers a degree of enhancement of the frequency component by the vertical sharpening processing unit when the input image signal significantly changes in the vertical direction, or lowers a degree of enhancement of the frequency component by the horizontal sharpening processing unit when the input image signal significantly changes in the horizontal direction.

9. An image processing method applied to a procedure employed by an image processing apparatus for sharpening an input image by generating a frequency component higher than a frequency component contained in an input image signal representing the input image, the image processing method comprising:

a horizontal direction processing step of removing, at least from a high frequency portion in a horizontal direction contained in the input image signal, a high frequency portion of a frequency component in a vertical direction of the input image signal and generating a harmonic in the horizontal direction containing a frequency component higher than the frequency component in the horizontal direction contained in the input image signal;

a vertical direction processing step of removing, at least from the high frequency portion in the vertical direction of the input image signal, a high frequency portion of a frequency component in the horizontal direction of the input image signal and generating a harmonic in the vertical direction containing a frequency component higher than the frequency component in the vertical direction contained in the input image signal; and a switchover step of switching over between parallel execution and series execution of the vertical direction processing step and the horizontal direction processing step, based on an amplification factor $\beta$, wherein the vertical direction processing step and the horizontal direction processing step are executed in series, or in parallel.

10. The image processing method according to claim 9, wherein the amplification factor $\beta$ is $0 \leq \beta \leq 1$.

11. The image processing method according to claim 9, further comprising a step of detecting a change of the input image signal and lowering, when the input image signal significantly changes in the vertical direction, a degree of enhancement of the frequency component at the vertical direction processing step, or lowering, when the input image signal significantly changes in the horizontal direction, a degree of enhancement of the frequency component at the horizontal direction processing step.

12. The image processing method according to claim 10, further comprising a step of detecting a change of the input image signal and lowering, when the input image signal significantly changes in the vertical direction, a degree of enhancement of the frequency component at the vertical direction processing step, or lowering, when the input image signal significantly changes in the horizontal direction, a degree of enhancement of the frequency component at the horizontal direction processing step.

13. An image processing method applied to a procedure employed by an image processing apparatus for sharpening an input image by generating a frequency component higher than a frequency component contained in an input image signal representing the input image, the image processing method comprising:

a horizontal direction processing step of removing, at least from a high frequency portion in a horizontal direction contained in the input image signal, a high frequency portion of a frequency component in a vertical direction of the input image signal and generating a harmonic in the horizontal direction containing a frequency component higher than the frequency component in the horizontal direction contained in the input image signal; and a vertical direction processing step of removing, at least from the high frequency portion in the vertical direction of the input image signal, a high frequency portion of a frequency component in the horizontal direction of the input image signal and generating a harmonic in the vertical direction containing a frequency component higher than the frequency component in the vertical direction contained in the input image signal, wherein at least one of the horizontal direction processing step and the vertical direction processing step has: a step of generating a first signal by removing at least a DC component of a frequency component contained in an input signal; a nonlinear processing step of generating a second signal by carrying out, on the first signal, nonlinear processing asymmetric between a positive region and a negative region of the first signal, the nonlinear processing being represented by a continuous function made up of nonlinear processing applied to the positive region of the first signal and nonlinear processing applied to the negative region those passing through an origin and, also, generating a frequency component having a frequency band asymmetric between the positive region and the negative region; and an adjustment step of generating a third signal by adjusting the second signal, and the vertical direction processing step and the horizontal direction processing step are executed in series, or in parallel.

14. The image processing method according to claim 13, further comprising a step of detecting a change of the input image signal and lowering, when the input image signal significantly changes in the vertical direction, a degree of enhancement of the frequency component at the vertical direction processing step, or lowering, when the input image signal significantly changes in the horizontal direction, a degree of enhancement of the frequency component at the horizontal direction processing step.

15. An image processing method applied to a procedure employed by an image processing apparatus for sharpening an input image by generating a frequency component higher than a frequency component contained in an input image signal representing the input image, the image processing method comprising:

a horizontal direction processing step of removing, at least from a high frequency portion in a horizontal direction contained in the input image signal, a high frequency portion of a frequency component in a vertical direction of the input image signal and generating a harmonic in the horizontal direction containing a frequency component higher than the frequency component in the horizontal direction contained in the input image signal; and a vertical direction processing step of removing, at least from the high frequency portion in the vertical direction of the input image signal, a high frequency portion of a frequency component in the horizontal direction of the input image signal and generating a harmonic in the vertical direction containing a frequency component higher than the frequency component in the vertical direction contained in the input image signal, wherein at least one of the horizontal direction processing step and the vertical direction processing step has: a nonlinear processing step of generating a first signal by carrying out nonlinear processing on an input signal, the nonlinear processing being represented by a nonlinear function containing the first signal in a continuous manner with respect to the input signal and, also, generating a frequency component that is not contained in the input signal; a step of generating a second signal by removing at least a DC component of a frequency component contained in the first signal; and a step of generating a third signal by adjusting the second signal, and the vertical direction processing step and the horizontal direction processing step are executed in series, or in parallel.

16. The image processing method according claim 15, further comprising a step of detecting a change of the input image signal and lowering, when the input image signal significantly changes in the vertical direction, a degree of enhancement of the frequency component at the vertical direction processing step, or lowering, when the input image signal significantly changes in the horizontal direction, a degree of enhancement of the frequency component at the horizontal direction processing step.

* * * * *